United States Patent
Ikenaga et al.

(10) Patent No.: US 9,272,218 B2
(45) Date of Patent: Mar. 1, 2016

(54) INFORMATION PROCESSING SYSTEM, INFORMATION PROCESSING METHOD, INFORMATION PROCESSING PROGRAM, COMPUTER-READABLE RECORDING MEDIUM ON WHICH INFORMATION PROCESSING PROGRAM IS STORED

(75) Inventors: Toshiya Ikenaga, Tokyo (JP); Osamu Ota, Tokyo (JP); Hirotoshi Maegawa, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 343 days.

(21) Appl. No.: 13/879,190

(22) PCT Filed: Aug. 11, 2011

(86) PCT No.: PCT/JP2011/068369
§ 371 (c)(1),
(2), (4) Date: Apr. 12, 2013

(87) PCT Pub. No.: WO2012/053272
PCT Pub. Date: Apr. 26, 2012

(65) Prior Publication Data
US 2013/0198334 A1 Aug. 1, 2013

(30) Foreign Application Priority Data
Oct. 19, 2010 (JP) ................................ 2010-235000

(51) Int. Cl.
*G06F 15/173* (2006.01)
*A63F 13/30* (2014.01)
(Continued)

(52) U.S. Cl.
CPC ................. *A63F 13/30* (2014.09); *A63F 13/10* (2013.01); *A63F 13/12* (2013.01); *A63F 13/44* (2014.09);
(Continued)

(58) Field of Classification Search
CPC ....... H04L 29/10; H04L 65/403; A63F 13/10; A63F 2300/209; A63F 2300/8017; A63F 13/12; A63F 13/30; A63F 13/44; A63F 9/45533
See application file for complete search history.

(56) References Cited

U.S. PATENT DOCUMENTS 7,914,380 B2 * 3/2011 Takahashi ........................ 463/40
8,255,825 B2 * 8/2012 Morris ........................... 715/781
(Continued)

FOREIGN PATENT DOCUMENTS

| CA | 2699061 A1 | 4/2009 |
|---|---|---|
| CN | 101001682 A | 7/2007 |

(Continued)

OTHER PUBLICATIONS

Office Action for corresponding CN Application No. 201180050395.0, dated Jul. 9, 2014.
(Continued)

*Primary Examiner* — Ario Etienne
*Assistant Examiner* — Andrea Hurst
(74) *Attorney, Agent, or Firm* — Matthew B. Dernier, Esq.

(57) ABSTRACT

Provided is an information processing system with which a new function can be added without altering an application program itself. The information processing system includes: a first execution information obtaining unit configured to obtain first execution information which indicates an execution state of a first execution unit configured to execute an application program; an execution information storing unit configured to store the first execution information; and the first execution unit or a second execution unit configured to execute the application program, in which the first execution unit or the second execution unit uses the stored first execution information to execute the application program.

7 Claims, 20 Drawing Sheets

(51) Int. Cl.
  *A63F 13/44* (2014.01)
  *G06F 9/455* (2006.01)
  *H04L 29/06* (2006.01)
  *A63F 13/40* (2014.01)

(52) U.S. Cl.
  CPC .......... *G06F 9/45533* (2013.01); *H04L 65/403* (2013.01); *A63F 2300/209* (2013.01); *A63F 2300/308* (2013.01); *A63F 2300/538* (2013.01); *A63F 2300/552* (2013.01); *A63F 2300/554* (2013.01); *A63F 2300/577* (2013.01); *A63F 2300/636* (2013.01); *A63F 2300/8017* (2013.01)

(56) References Cited

U.S. PATENT DOCUMENTS

| | | | | |
|---|---|---|---|---|
| 8,583,761 | B2* | 11/2013 | Park et al. | 709/218 |
| 2001/0044339 | A1* | 11/2001 | Cordero et al. | 463/42 |
| 2002/0142842 | A1* | 10/2002 | Easley et al. | 463/42 |
| 2004/0259641 | A1* | 12/2004 | Ho | 463/42 |
| 2004/0266529 | A1* | 12/2004 | Chatani | 463/40 |
| 2008/0032759 | A1* | 2/2008 | Takahashi | 463/1 |
| 2009/0118018 | A1* | 5/2009 | Perlman et al. | 463/42 |
| 2010/0088630 | A1* | 4/2010 | Morris | 715/781 |
| 2010/0124992 | A1* | 5/2010 | Park et al. | 463/42 |
| 2010/0149120 | A1* | 6/2010 | Lee et al. | 345/173 |
| 2010/0229108 | A1* | 9/2010 | Gerson et al. | 715/757 |
| 2011/0087992 | A1* | 4/2011 | Wang et al. | 715/784 |

FOREIGN PATENT DOCUMENTS

| | | |
|---|---|---|
| JP | 2003-320164 A | 11/2003 |
| JP | 2003-320170 A | 11/2003 |
| JP | 2005-252433 A | 9/2005 |
| JP | 2006-006853 A | 1/2006 |
| JP | 2007075466 A | 3/2007 |
| JP | 2007-527258 A | 9/2007 |
| JP | 2008-131145 A | 6/2008 |
| JP | 2010123118 A | 6/2010 |
| KR | 20010085489 A | 9/2001 |
| KR | 20100067296 A | 6/2010 |

OTHER PUBLICATIONS

Office Action for corresponding KR Application No. 10-2013-7012330, dated Jul. 28, 2014.
European Search Report for corresponding EP Application No. 11834114.8, dated Nov. 11, 2013.
Office Action for corresponding KR Application 10-2013-7012330, dated Jan. 7, 2015.
International Search Report for corresponding PCT Application PCT/JP2011/068369, dated Nov. 15, 2011.
International Preliminary Report on Patentability for corresponding PCT Application PCT/JP2011/068369, dated May 16, 2013.
Office Action for corresponding CN Application No. 201180050395.0, dated Sep. 7, 2014.
Office Action for corresponding RU Application 2013122666/12, dated Feb. 11, 2015.
Office Action for corresponding Japanese Application 2010-235000, dated Mar. 24, 2015.

* cited by examiner

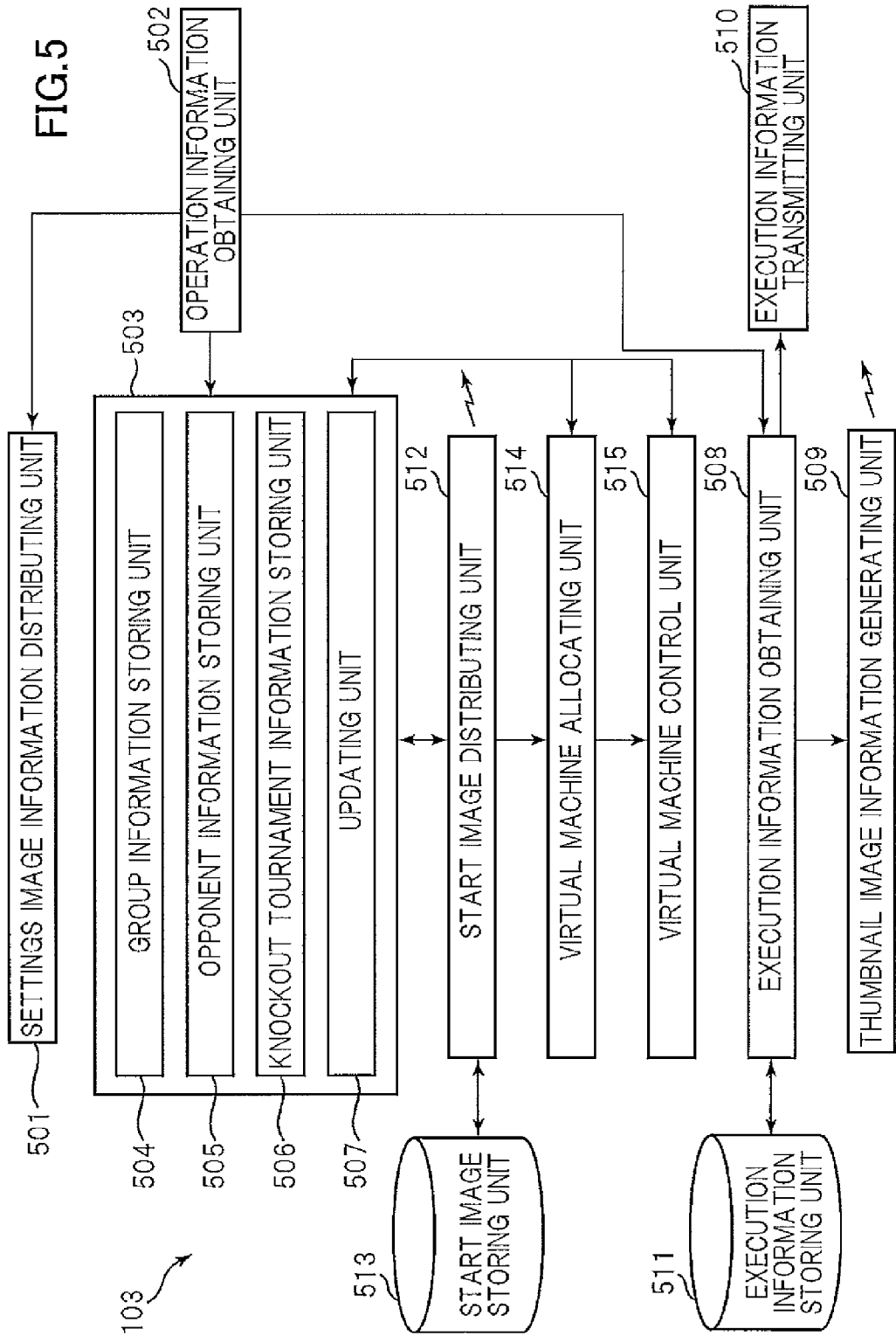

FIG.7(A)
OPPONENT INFORMATION

| GAME IDENTIFICATION INFORMATION | USER IDENTIFICATION INFORMATION | RANK IDENTIFICATION INFORMATION |
|---|---|---|
| g1 | u1 | r1 |
| g1 | u2 | r2 |
| g1 | u3 | r3 |
| g2 | u5 | r1 |
| ⋮ | ⋮ | ⋮ |

FIG.7(B)
INDIVIDUAL VS. INDIVIDUAL KNOCKOUT TOURNAMENT INFORMATION

| GAME IDENTIFICATION INFORMATION | NODE IDENTIFICATION INFORMATION | USER IDENTIFICATION INFORMATION | ROUND IDENTIFICATION INFORMATION |
|---|---|---|---|
| g1 | n1 | u1 | 1 |
| g1 | n2 | u2 | 1 |
| g1 | n3 | u3 | 1 |
| g1 | n4 | u4 | 1 |
| g1 | n5 | u1 | 2 |
| g1 | n6 | u3 | 2 |
| g1 | n7 | u1 | 3 |
| g2 | n11 | u5 | 1 |
| ⋮ | ⋮ | ⋮ | ⋮ |

FIG.7(C)
GROUP VS. GROUP ONE-SHOT PLAY INFORMATION

| GAME IDENTIFICATION INFORMATION | USER IDENTIFICATION INFORMATION | GROUP IDENTIFICATION INFORMATION | LEADER IDENTIFICATION INFORMATION | PRIORITY ORDER IDENTIFICATION INFORMATION | RANK IDENTIFICATION INFORMATION |
|---|---|---|---|---|---|
| g1 | u1 | G1 | 1 | 1 | 1 |
| g1 | u2 | G1 | 0 | 2 | 2 |
| g1 | u3 | G2 | 1 | 1 | 2 |
| g1 | u4 | G2 | 0 | 2 | 2 |
| ⋮ | ⋮ | ⋮ | ⋮ | ⋮ | ⋮ |

FIG.7(D)
GROUP VS. GROUP KNOCKOUT TOURNAMENT INFORMATION

| GAME IDENTIFICATION INFORMATION | NODE IDENTIFICATION INFORMATION | GROUP IDENTIFICATION INFORMATION | ROUND IDENTIFICATION INFORMATION |
|---|---|---|---|
| g1 | n1 | G1 | 1 |
| g1 | n2 | G1 | 1 |
| g1 | n3 | G3 | 1 |
| g1 | n4 | G4 | 1 |
| g1 | n5 | G1 | 2 |
| g1 | n6 | G3 | 2 |
| g1 | n7 | G1 | 3 |
| ⋮ | ⋮ | ⋮ | ⋮ |

FIG.9
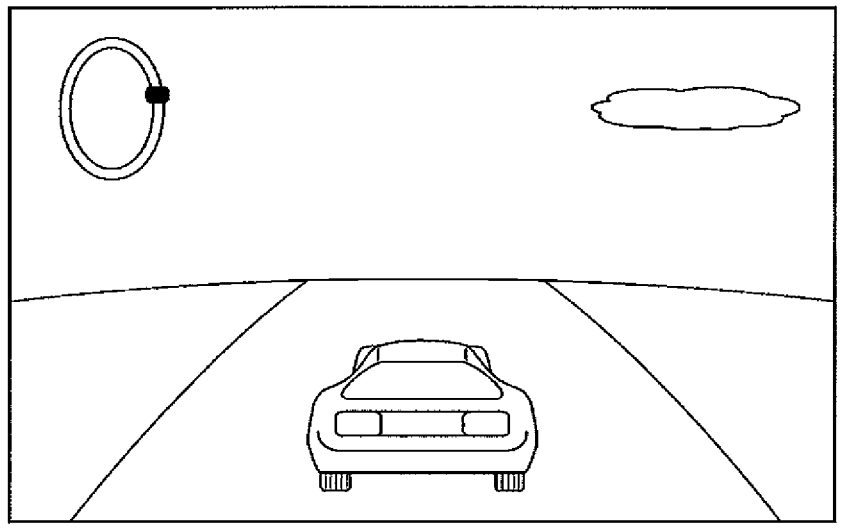
(A)
(B)
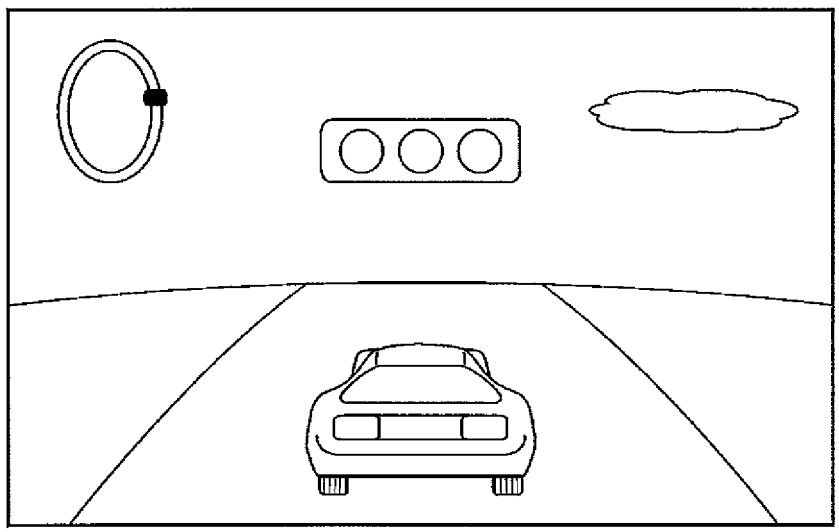
(C)

| GAME IDENTIFICATION INFORMATION | CONDITION INFORMATION ADDRESS | PROCESSING INFORMATION ADDRESS |
|---|---|---|
| g1 | c1 | s1 |
| g1 | c2 | s2 |
| g1 | c3 | s3 |
| g1 | c4 | s4 |
| g2 | c1 | s5 |
| g2 | c2 | s6 |
| ⋮ | ⋮ | ⋮ |

| USER IDENTIFICATION INFORMATION | CHECKPOINT IDENTIFICATION INFORMATION | TIME INFORMATION |
|---|---|---|
| u1 | a | 1:10 |
| u2 | a | 1:20 |
| u3 | a | 1:23 |
| u4 | a | 1:25 |
| u1 | b | 2:20 |
| ⋮ | ⋮ | ⋮ |

| No.1 | 01:55:00 | user1 |
| No.2 | 02:01:00 | user2 |
| No.3 | | |

INFORMATION PROCESSING SYSTEM, INFORMATION PROCESSING METHOD, INFORMATION PROCESSING PROGRAM, COMPUTER-READABLE RECORDING MEDIUM ON WHICH INFORMATION PROCESSING PROGRAM IS STORED

TECHNICAL FIELD

The present invention relates to an information processing system, an information processing method, an information processing program, and a computer-readable recording medium having an information processing program stored thereon.

BACKGROUND ART

There has been known a technology for implementing a function of resuming the execution of a game in a game program that is executed on a single game machine when a pause instruction is given to suspend the game and then a restart instruction is given, from the state the game has been in immediately after the pause instruction has been given. There has also been known a technology for implementing a function of storing video information, for example, a scene in a game or a video, in a shared server. Another known technology implements a function with which, for example, a play screen of a game executed on one game machine can be viewed on another game machine.

An object of one or more embodiments of the present invention is to provide an information processing system, an information processing method, an information processing program, and a computer-readable recording medium having an information processing program stored thereon with which the functions described above are implemented without altering an application program itself.

SUMMARY OF INVENTION

Technical Problem

However, an application program as described above is designed to be executed on a device dedicated to the application program. Adding a new function to the application program, for example, adding a multi-player function which enables a plurality of players to play at the same time to a game (application program) designed to be played by a single player, requires an alteration to the application program itself.

One or more embodiments of the present invention has been made in view of the problem described above, and an object of one or more embodiments of the present invention is to provide an information processing system, an information processing method, an information processing program, and a computer-readable recording medium having an information processing program stored thereon with which a new function can be added without altering an application program itself.

Solution to Problem

According to the present invention, there is provided an information processing system, including: a first execution information obtaining unit configured to obtain first execution information which indicates an execution state of a first execution unit configured to execute an application program; an execution information storing unit configured to store the first execution information; and the first execution unit or a second execution unit configured to execute the application program, in which the first execution unit or the second execution unit uses the stored first execution information to execute the application program.

According to the present invention, there is provided an information processing method, including: obtaining first execution information which indicates an execution state of a first execution unit configured to execute an application program; storing the first execution information; and executing the application program by using the stored first execution information.

According to the present invention, there is provided an information processing program for causing a computer to function as: a first execution information obtaining unit configured to obtain first execution information which indicates an execution state of a first execution unit configured to execute an application program; an execution information storing unit configured to store the first execution information; and the first execution unit or a second execution unit configured to execute the application program, in which the first execution unit or the second execution unit uses the stored first execution information to execute the application program.

According to the present invention, there is provided an information processing system, including: a plurality of first information processing units each including: an execution unit configured to execute an application program; and a first information obtaining unit configured to obtain image information or execution information that results from the execution of the application program by the execution unit; and a second information processing unit including: an information storing unit configured to obtain pieces of the image information or pieces of the execution information from the plurality of first information processing units, and storing the obtained pieces of the image information or the obtained pieces of the execution information; and an image information transmitting unit configured to transmit, to terminals, pieces of image information that are generated based on the stored pieces of image information or the stored pieces of execution information, in which, upon instruction from one of the terminals, each of the first information obtaining units obtains image information that results from executing the application program by one of the execution units that is associated with the one of the terminals.

According to the present invention, there is provided an information processing method, including: executing an application program by respective execution units; obtaining pieces of image information or pieces of execution information that result from the execution of the application program by the respective execution units; obtaining and storing the pieces of image information or the pieces of execution information; transmitting, to terminals, pieces of image information that are generated based on the stored pieces of image information or the stored pieces of execution information; and obtaining, upon instruction from one of the terminals, image information that results from executing the application program by one of the execution units that is associated with the one of the terminals.

According to the present invention, there is provided an information processing program for causing a computer to function as: a plurality of first information processing units each including: an execution unit configured to execute an application program; and a first information obtaining unit configured to obtain image information or execution information that results from the execution of the application program by the execution unit; and a second information processing unit including: an image information storing unit configured to obtain pieces of the image information or pieces of the execution information from the plurality of first information processing units, and storing the obtained pieces of the image information or the obtained pieces of the execution information; and an image information transmitting unit configured to transmit, to terminals, pieces of image information that are generated based on the stored pieces of image information or the stored pieces of execution information, in which, upon instruction from one of the terminals, each of the first information obtaining units obtains image information that results from executing the application program by one of the execution units that is associated with the one of the terminals.

According to the present invention, there is provided an information processing system, including: a plurality of execution units configured to execute an application program; an image information obtaining unit configured to obtain all or some of pieces of image information that result from executing the application program by the plurality of execution units; and an image information transmitting unit configured to transmit, to one of terminals, upon instruction from the one of terminals, a piece of image information that is associated with the one of terminals out of the all or some of pieces of image information.

According to the present invention, there is provided an information processing method, including: executing an application program by a plurality of execution units; obtaining all or some of pieces of image information that result from executing the application program by the plurality of execution units; and transmitting, to one of terminals, upon instruction from the one of terminals, a piece of image information that is associated with the one of terminals out of the all or some of pieces of image information.

According to the present invention, there is provided an information processing program for causing a computer to function as: a plurality of execution units configured to execute an application program; an image information obtaining unit configured to obtain all or some of pieces of image information that result from executing the application program by the plurality of execution units; and an image information transmitting unit configured to transmit, to one of terminals, upon instruction from the one of terminals, a piece of image information that is associated with the one of terminals out of the all or some of pieces of image information.

Advantageous Effects of Invention

It is possible to provide the information processing system, the information processing method, the information processing program, and the computer-readable recording medium having an information processing program stored thereon with which a new function that is not included in an application program can be added.

BRIEF DESCRIPTION OF DRAWINGS

[FIG. 5] A diagram illustrating the functional configuration of a management server in the embodiment.

[FIG. 7(A)] A diagram illustrating an example of management information in the embodiment.

[FIG. 7(B)] A diagram illustrating an example of different management information in the embodiment.

[FIG. 7(C)] A diagram illustrating an example of different management information in the embodiment.

[FIG. 7(D)] A diagram illustrating an example of different management information in the embodiment.

[FIG. 9] Diagrams illustrating an example of a start screen in the embodiment.

DESCRIPTION OF EMBODIMENTS

Figure 1:
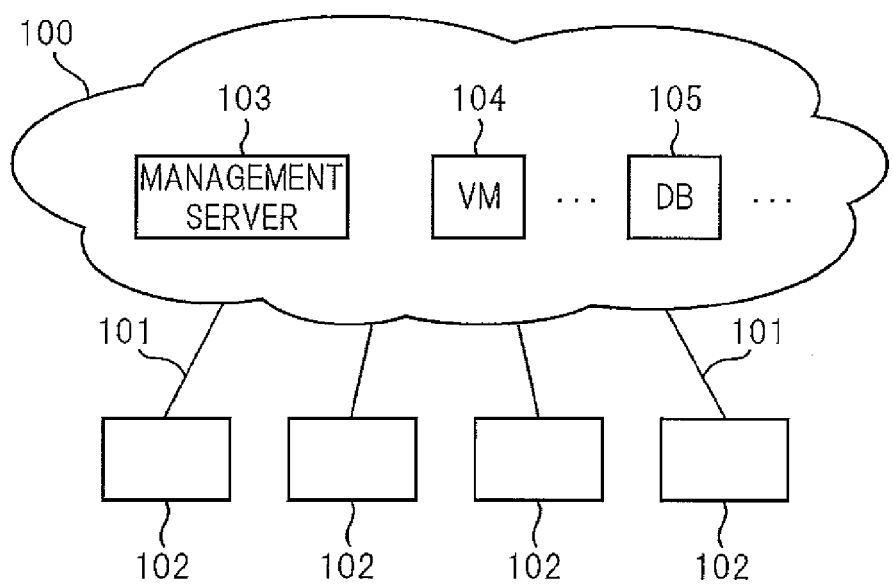
[FIG. 1] A diagram illustrating an outline of an information processing system according to an embodiment of the present invention.

A description is now given of an embodiment of the present invention referring to the drawings. Throughout the drawings, the same or similar components are denoted by the same reference numerals, and a duplicated description thereof is therefore omitted.

FIG. 1 is a diagram illustrating an information processing system according to the embodiment of the present invention. As illustrated in FIG. 1, the information processing system in this embodiment includes a cloud platform 100 and one or a plurality of terminals 102. Each terminal 102 is connected to the cloud platform 100 via a network 101.

The cloud platform 100 includes a management server 103, one or a plurality of virtual machines (VMs) 104 described later, and one or a plurality of databases (DBs) 105. The cloud platform 100 as used herein is a general mode of utilization of computers that has the network 101 as the base, and means a platform for enabling a user to use computer processing as a service via a network.

Figure 2:
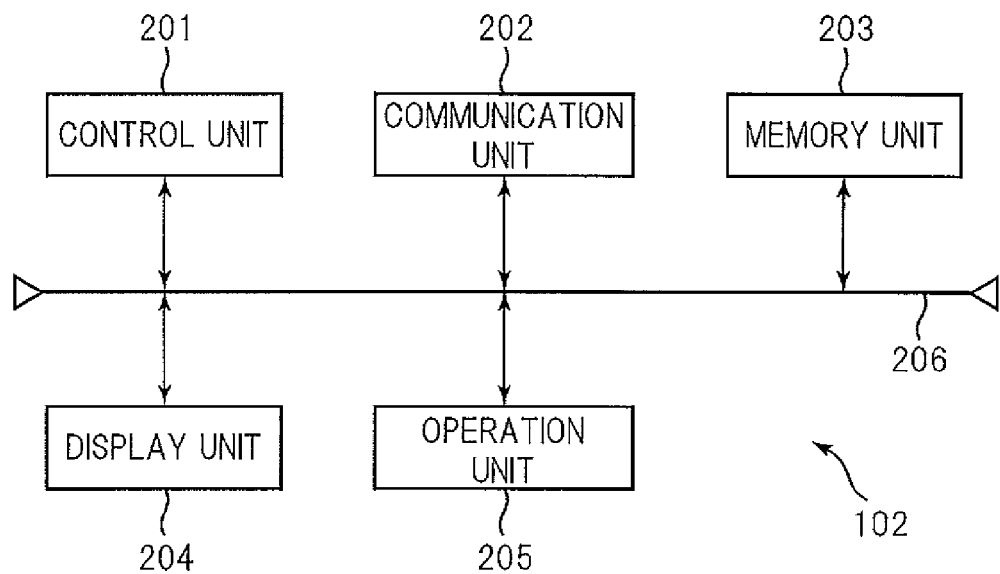
[FIG. 2] A diagram illustrating the configuration of each terminal in the embodiment.

Each terminal 102 includes a control unit 201, a communication unit 202, a memory unit 203, a display unit 204, and an operation unit 205 as illustrated in FIG. 2. The units 201 to 205 are connected to one another via a bus 206.

The control unit 201 is, for example, a CPU or an MPU, and operates in accordance with a program stored in the memory unit 203. The memory unit 203 includes an information recording medium such as a hard disk drive, a ROM, or a RAM, and is an information recording medium having stored thereon programs executed by the control unit 201. Moreover, the memory unit 203 also operates as a work memory for the control unit 201. The programs processed by the control unit 201 may be downloaded and provided, for example, via the network 101, or may be provided by means of various computer-readable information recording media such as a CD-ROM and a DVD-ROM. The operation unit 205 includes, for example, an interface such as a keyboard, a mouse, a controller, and a button, and outputs, in response to an instruction operation by a user, details of the instruction operation to the control unit 201. The display unit 204 is, for example, a liquid crystal display, a CRT display, or an organic EL display, and displays information as instructed by the control unit 201.

The configuration of the terminal 102 is given as an example, and the present invention is not limited thereto. Each data base 105 and the management server 103 also include a control unit 201, a communication unit 202, and a memory unit 203 that are similar to the ones described above, and a detailed description thereof is omitted.

Figure 3:
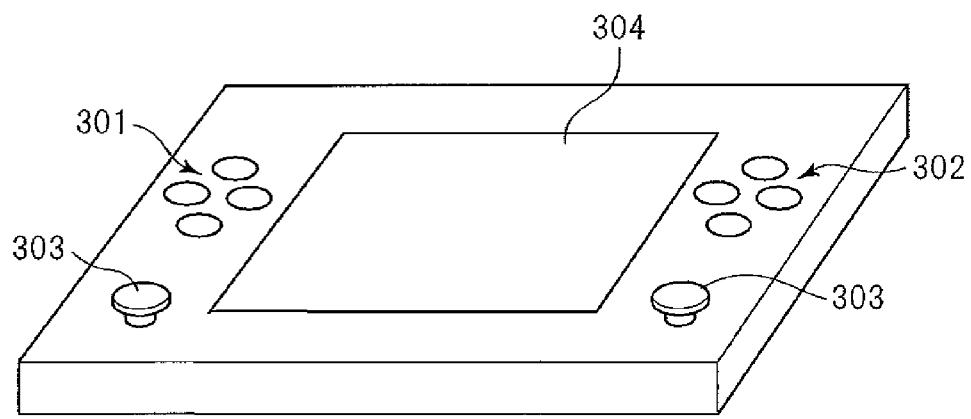
[FIG. 3] A diagram illustrating an example of the exterior appearance of the terminal in the embodiment.

FIG. 3 is a diagram illustrating an example of the external appearance of the terminal. As illustrated in FIG. 3, for example, the terminal 102 has, as the operation unit 205, direction keys 301, a plurality of buttons 302, and analog operation units 303, and has a display screen 304 as the display unit 204.

The direction keys 301 include, for example, an upward direction instructing key, a downward direction instructing key, a rightward direction instructing key, and a leftward direction instructing key. With the direction keys 301, the user moves an object on the screen up, down, to the left, or to the right, for example. Each of the plurality of buttons 302 is marked with, for example, a, b, c, or d. The user pushes these buttons 302 to execute, for example, processing procedures assigned to the respective buttons by an application program that is being executed.

The analog operation units 303 can each be operated so as to, for example, tilt from a given reference position, and the user inputs input information which reflects the amount and direction of tilt of the analog operation unit 303 from the reference position. For instance, the user can use one of the analog operation units 303 to tilt an object displayed on the display screen 304 in a desired direction by a desired amount in connection with the amount and direction of tilt of the analog operation unit 303. The display screen 304 that is the display screen 304 of the display unit 204 displays, for example, an image relevant to the application program.

The external appearance of the terminal 102 that is illustrated in FIG. 3 and the configurations of the operation unit 205 and the display unit 204 are given as an example, and the present invention is not limited thereto. For instance, the operation unit 205 may be constituted of a touch panel screen displayed by the display unit 204, and the display unit 204 may be a display screen of a monitor constituted of a CRT or a liquid crystal display device, or other displays. The number of the direction keys 301, the number of the plurality of buttons 302, and the number of the analog operation units 303 may be other numbers than those given above. The terminal 102 may include other buttons such as a start button and a select button (not shown), an acceleration sensor, and the like.

Figure 4:
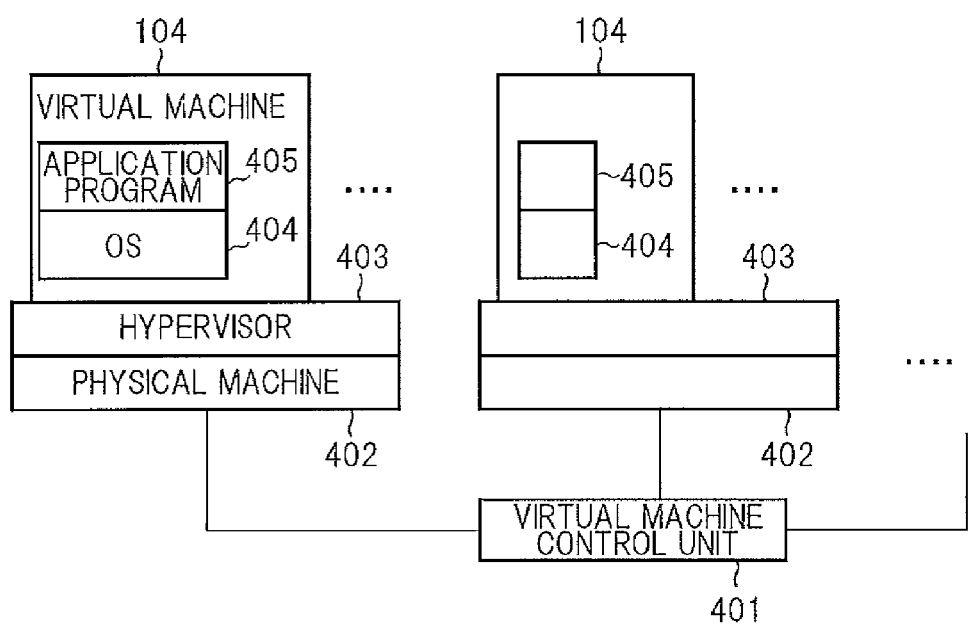
[FIG. 4] A diagram illustrating virtual machines in the embodiment.

FIG. 4 is a diagram illustrating the virtual machines of FIG. 1. As illustrated in FIG. 4, the cloud platform 100 includes a virtual machine control unit 401 and a group of physical machines 402 connected to the virtual machine control unit 401.

A hypervisor 403 is provided on each physical machine 402, and the one or plurality of virtual machines (VMs) 104 are launched on the hypervisors 403 as illustrated in FIG. 4. The hypervisors 403 are software that launch the virtual machine (s) 104 on the physical machines 402 without the assistance of a general-purpose OS, and control the virtual machine(s) 104. Each virtual machine 104 is a virtually created set of a CPU and a memory as well known. It should be understood that each physical machine 402 is a computer constituted of a CPU, a memory, and others.

Each virtual machine 104 has an OS 404 and application programs 405. The program described above processed on the virtual machine 104 corresponds to one of the application programs 405. The virtual machine control unit 401 generates the one or a plurality of virtual machines 104 on the physical machines 402. This is accomplished specifically by allocating resources of the physical machines 402 (resources such as CPU processing time and memory capacity) to the virtual machine (s) 104 via the hypervisors 403 and controlling the resources.

In other words, the installation and execution of a program in the virtual machine (s) 104 described below actually takes place on the physical machines 402. For instance, a memory unit constituted of memories of the physical machines 402 or the like stores a plurality of programs including a program of this embodiment, and the program of this embodiment is executed actually by one or a plurality of CPUs of the physical machines 402. In executing the program of this embodiment, one or a plurality of CPUs of the physical machines 402 are used for the above-mentioned plurality of programs as well. For instance, the processing time of the one or plurality of CPUs is divided and a fraction thereof is allocated to the execution of the program of this embodiment. The virtual machine (information processing unit) configuration described above is given as an example, and the present invention is not limited thereto.

FIG. 5 is a diagram illustrating the functional configuration of the management server. As illustrated in FIG. 5, the management server 103 includes, for example, a settings image information distributing unit 501, an operation information obtaining unit 502, a management information setting unit 503, an execution information obtaining unit 508, a thumbnail image information generating unit 509, an execution information transmitting unit 510, a start image distributing unit 512, a virtual machine allocating unit 514, and a virtual machine control unit 515.

The settings image information distributing unit 501 responds to the user's instruction by distributing to the relevant terminal 102 image information about game settings, such as a screen for allowing the user to select a game and a screen for allowing the user to select a play format which are described later. The operation information obtaining unit 502 obtains operation information about a user's operation instruction, such as the user's game selection operation instruction and group selection instruction which are described later. The management information setting unit 503 includes a group information storing unit 504, an opponent information storing unit 505, a knockout tournament information storing unit 506, and an updating unit 507.

A concrete example is described with reference to FIGS. 6(A) to 6(H). The settings image information distributing unit 501 responds to a user's game selecting screen request by distributing, to the terminal 102 that is associated with the user, image information about a game selecting screen, for example, one illustrated in FIG. 6(A). The user refers to the game selecting screen displayed by the display unit 204 of the terminal 102 that is associated with the user to select a desired game. The game selecting screen at this point may display, for each game, information related to the game, such as the title and image of the game and the number of users who have played the game. In the case where the game in question is, for example, a part of a given game such as one course of a racing game, the game selecting screen may display the name of the course and the shortest time required to clear the part of the game among records of a plurality of players, i.e., the top time. The relevant information or the like is obtained by the settings image information distributing unit 501 from, for example, the database(s) 105.

Figure 6A:
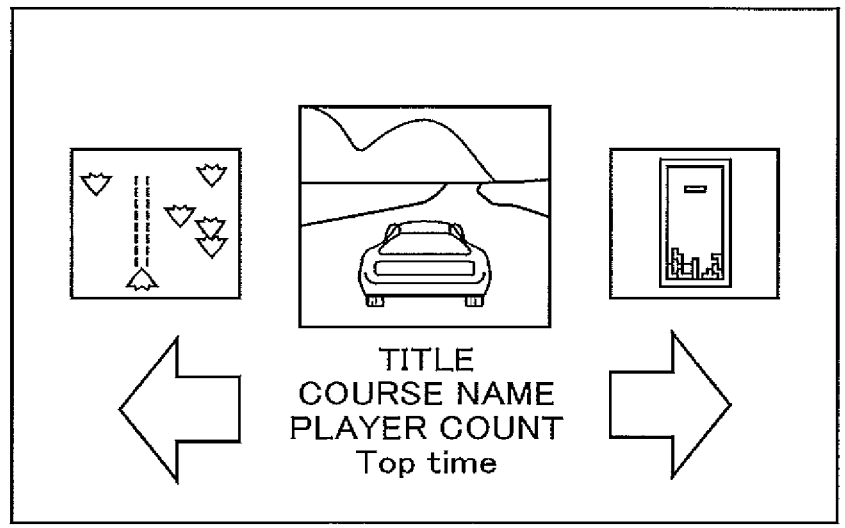
[FIG. 6(A)] A diagram illustrating an example of a setting screen in the embodiment.
Figure 6B:
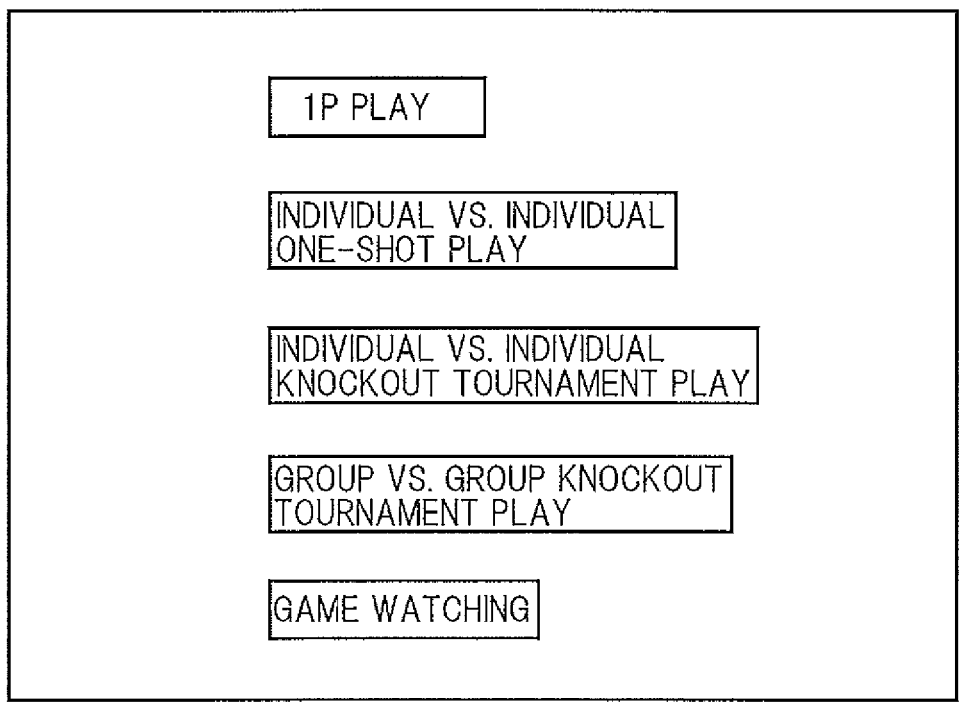
[FIG. 6(B)] A diagram illustrating an example of a different setting screen in the embodiment.

When a game is selected, the settings image information distributing unit 501 distributes to the terminal 102 image information about a play format selecting screen for selecting the play format and others of the selected game, for example, one illustrated in FIG. 6(B). The user refers to the play format selecting screen displayed by the display unit 204 of the terminal 102 to select a play format and others.

Figure 6C:
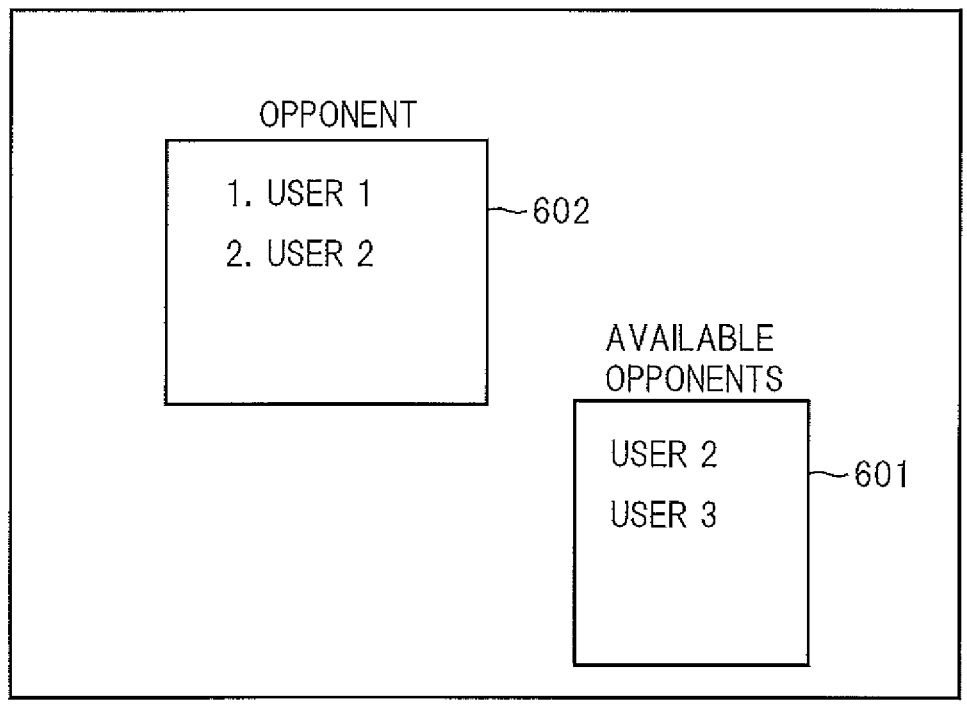
[FIG. 6(C)] A diagram illustrating an example of a different setting screen in the embodiment.

In the case where individual vs. individual one-shot play is selected on the play format selecting screen, the settings image information distributing unit 501 distributes to the terminal 102 image information for displaying an opponent setting screen, for example, one illustrated in FIG. 6(C). The user can select an opponent by, for example, dragging to an opponent window 602 the name of another user who is displayed in an available opponent window 601 of the opponent setting screen displayed on the terminal 102 and who is similarly selecting individual vs. individual one-shot play. FIG. 6(C) illustrates specifically a case where User 1 selects User 2 as an opponent. The available opponent window 601 may display the names of users whose video data or the like described later has been recorded. The user in this case can participate in, for example, individual vs. individual one-shot play or individual vs. individual knockout tournament play quasi-synchronously, although it is asynchronous in actuality.

Once the user determines an opponent, the opponent information storing unit 505 stores, as opponent information, the user identification information of the opponent decided in the manner described above in association with the identification information of the game. The opponent information storing unit 505 may further store, for example, rank identification information for identifying rank information, which indicates for each user the level of proficiency or the like of the user in the selected game, as illustrated in FIG. 7(A), and other types of relevant information, for example, a friend list or a group name that is registered by the user, in association with the user identification information.

Figure 6D:
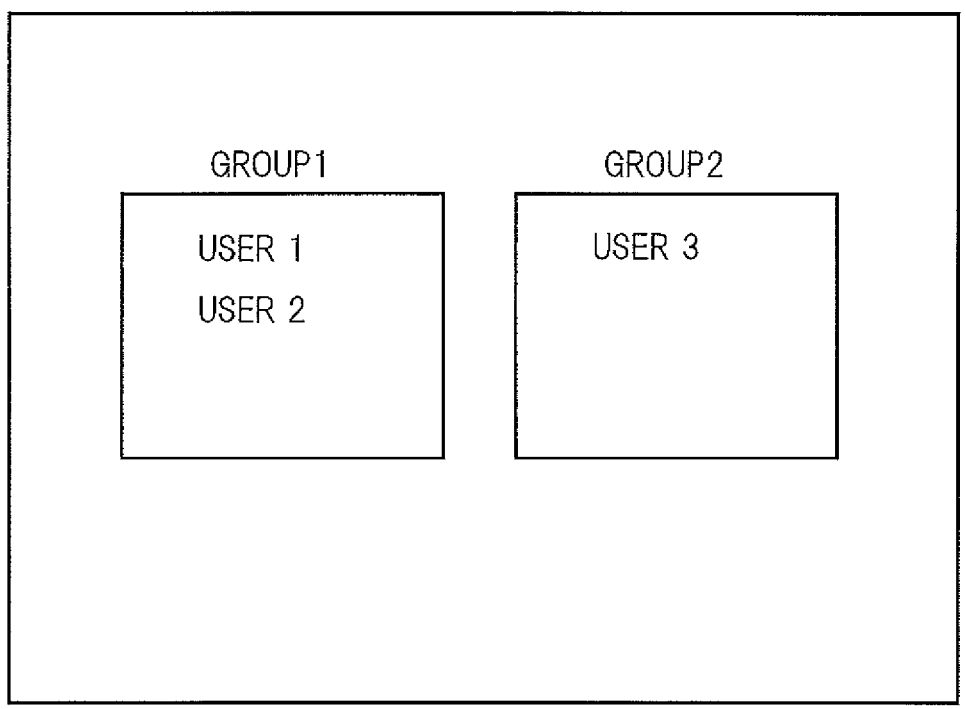
[FIG. 6(D)] A diagram illustrating an example of a different setting screen in the embodiment.
Figure 6E:
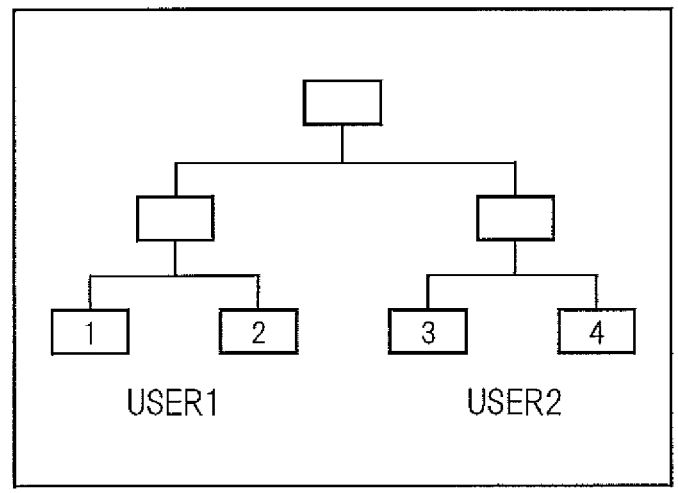
[FIG. 6(E)] A diagram illustrating an example of a different setting screen in the embodiment.

In the case where individual vs. individual knockout tournament play is selected, image information for displaying a knockout tournament setting screen, for example, one illustrated in FIG. 6(E), is distributed to the terminal 102. The user can participate in an individual vs. individual knockout tournament by, for example, selecting one from Node 1 to Node 4 that the knockout tournament setting screen displayed on the terminal 102 displays. FIG. 6(E) illustrates specifically a case where User 1 selects Node 1, User 2 selects Node 3, and Node 2 and Node 4 are not selected by any users. Once a knockout tournament chart is established (by, for example, determining which user is represented by which node out of Node 1 to Node 4), the knockout tournament information storing unit 506 stores, for example, the game identification information of the selected game, information for identifying a node in the knockout tournament chart, and user identification information in association with one another as individual vs. individual knockout tournament information in a table format as illustrated in FIG. 7(B). The knockout tournament information storing unit 506 further holds as individual vs. individual knockout tournament information, for each piece of game identification information, a tree structure in which each node is associated with node identification information, for example, one illustrated in FIG. 8. Based on these, a pair of users who compete against each other are determined for each competition in each round of the knockout tournament. User names displayed beside knockout tournament nodes may be the names of users whose video data or the like described later has been recorded. In this case, for example, multiple users can participate in individual vs. individual knockout tournament play quasi-simultaneously, although it is asynchronous in actuality. The knockout tournament information storing unit may also store rank information of each user in association, as is the case for the opponent information storing unit described above.

Figure 6F:
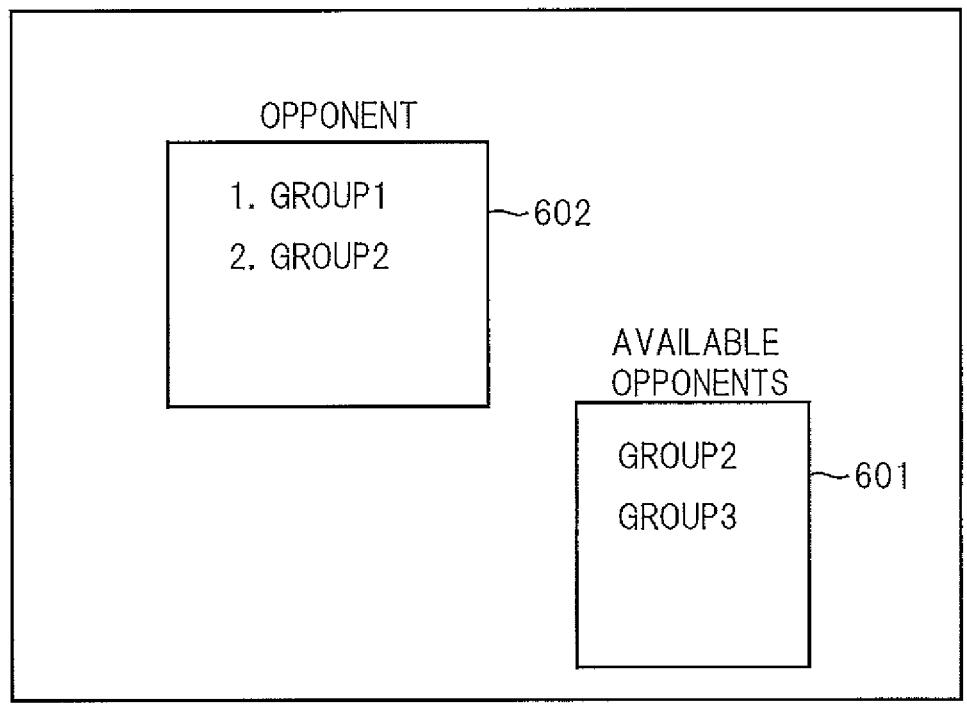
[FIG. 6(F)] A diagram illustrating an example of a different setting screen in the embodiment.
Figure 6G:
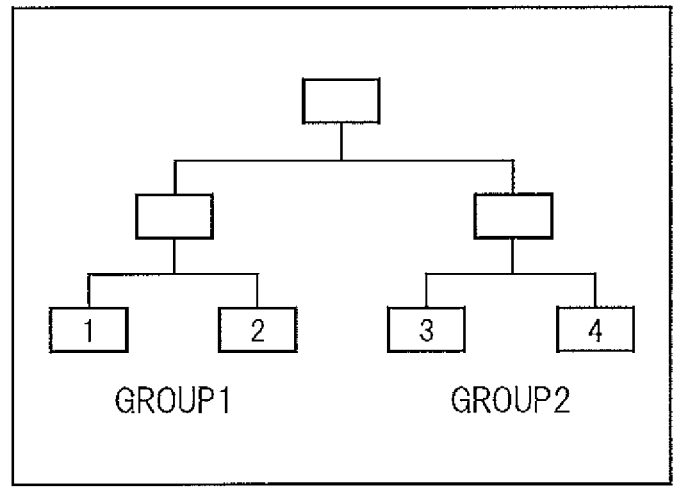
[FIG. 6(G)] A diagram illustrating an example of a different setting screen in the embodiment.

In the case where group vs. group one-shot play or group vs. group knockout tournament play is selected, image information for displaying a knockout tournament setting screen, for example, one illustrated in FIG. 6(D), is distributed to the terminal 102. The user can refer to this group setting screen displayed on the terminal 102 to select, for example, a group to which the user belongs. This screen may be designed so that the priority order of users included in the group and a leader who has the right to represent the group can be determined for each group. The group information storing unit 504 stores groups set in the manner described above by storing, for example, the game identification information of the selected game, user identification information, and group identification information in association with one another as illustrated in FIG. 7(C). In addition to user identification information, the group information storing unit 504 may further store leader identification information, which indicates whether or not a user is the leader of a group, priority order identification information about a place in priority order, the rank information described above, and others in association with the user identification information. The group vs. group one-shot play format and the group vs. group knockout tournament play format are the same as the cases illustrated in FIGS. 6(C) and 6(E), except that a group instead of a user is selected as an opponent or the like as illustrated in, for example, FIGS. 6(F) and 6(G). A detailed description thereof is therefore omitted. The selection of an opponent or the like in FIGS. 6(F) and 6(G) is made by, for example, users who are set as the leaders of the respective groups.

Figure 6H:
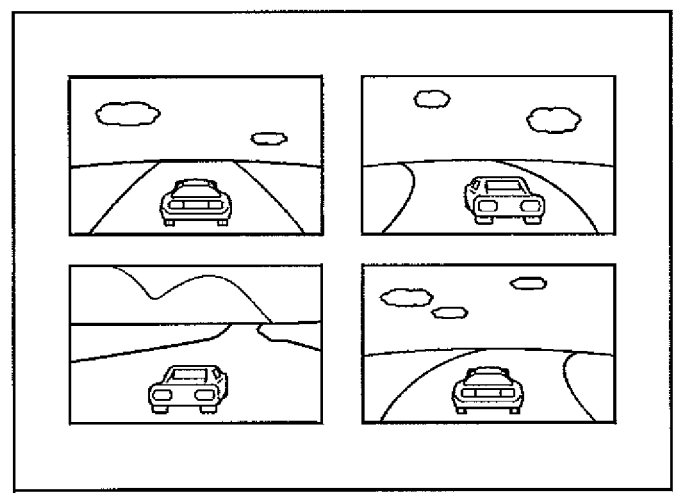
[FIG. 6(H)] A diagram illustrating an example of a different setting screen in the embodiment.

In the case where game watching is selected, the display unit 204 of the terminal 102 displays a thumbnail menu screen which displays in thumbnails a plurality of pieces of image information currently generated by the respective virtual machines 104, for example, one illustrated in FIG. 6(H). The user refers to this display of thumbnails and selects a desired thumbnail image (which corresponds to an instruction from the terminal 102, for example), with the result that the associated image information is displayed by the display unit 204 of the terminal 102. It should be understood that the thumbnail menu may additionally display relevant information which includes, among others, the play formats, groups, and users' ranks described above.

To give a concrete description of this case, the execution information obtaining unit 508 obtains image information generated by each virtual machine 104 which is described later. From the obtained pieces of image information, the thumbnail image information generating unit 509 generates image information for generating a thumbnail menu screen with a plurality of thumbnail images arranged therein as the one illustrated in FIG. 6(H), and transmits the generated image information to the terminal 102 that is associated with the user who has selected game watching as the play format. The user issues an instruction to select a desired thumbnail and, in response to the instruction, the execution information transmitting unit 510 transmits image data associated with the thumbnail to the terminal 102. The user can thus watch a desired game. While the user is allowed to select game watching in the play format selecting screen after selecting a game in the description given above, the information processing system may be configured so that game watching can be selected in the game selecting screen.

The image information of FIG. 6(H) which is displayed in thumbnails may include image information stored in an execution information storing unit 511. In this case, the execution information obtaining unit 508 obtains image information stored in the execution information storing unit 511, and the thumbnail image information generating unit 509 generates, from the obtained image information, image information for generating a thumbnail menu screen with a plurality of thumbnail images arranged therein as the one illustrated in FIG. 6(H), and transmits the generated image information to the terminal 102 where game watching has been selected as the play format. The execution information storing unit 511 may be configured so as to, for example, store image information about a particular scene specified by a user who is watching a game which is obtained from the execution information obtaining unit 508 in response to an operation instruction from the user. This enables the information processing system to store, for example, a collection of play sessions regarding a particular scene. The image information in the description given above may be replaced with animated image information or may include other types of information such as audio information. The thumbnail menu screen may additionally display for each thumbnail image various types of information associated with the thumbnail image, for example, the name of a user, the rank of the user, the play time, and the play format. The execution information transmitting unit 510 may also be configured so as to, for example, transmit image information that is stored in the execution information storing unit 511 in association with a user in response to the user's instruction (an instruction from the terminal) as described above. The information processing system may also be configured so that, for example, image information associated with a user in question is generated by the virtual machine 104 that is associated with the user based on execution information that is stored in the execution information storing unit 511 in association with the user, and the image information is transmitted to the user by the virtual machine 104 or by the execution information transmitting unit 510.

The execution information storing unit 511 may also be configured so as to, for example, store execution information of an execution unit 806 of the relevant virtual machine 104 which is described later in response to a play recording instruction issued by the user to the terminal 102. In this case, the execution unit 806 can, for example, upload a play scene of a game program by executing the game program with the use of the stored execution information as described later.

The start image distributing unit 512 distributes to each terminal 102 a start image that is determined by management information such as the opponent information and individual vs. individual knockout tournament information described above. The information processing system may be configured so that the distribution of a start image begins, for example, in response to an instruction from a given user (e.g., the leader of a group), or begins after a given length of time elapses since an opponent and other items to be decided are determined.

A concrete description is given taking as an example a case where the identification information of the selected game is g1 and the opponent information is as illustrated in FIG. 7(A). In this case, user identification information u1 to user identification information u3 are stored in the opponent information storing unit 505, and start images are therefore distributed to the terminals 102 that are respectively associated with the user identification information u1 to the user identification information u3.

Figure 8:
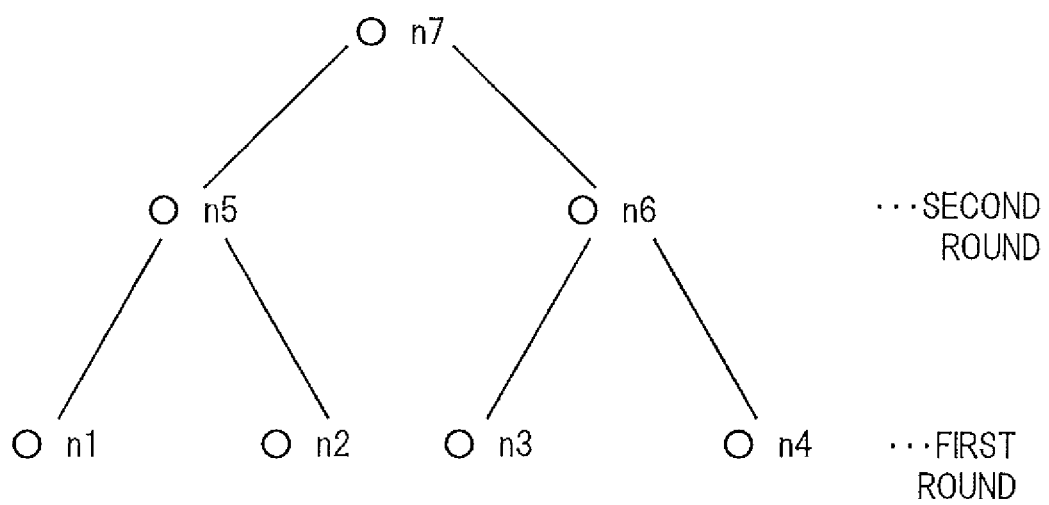
[FIG. 8] A diagram illustrating an example of the tree structure of a knockout tournament chart in the embodiment.

In the case where the identification information of the selected game is g1 and the individual vs. individual knockout tournament information is as illustrated in FIG. 7(B) and FIG. 8, for example, the first round of the knockout tournament is made up of a competition between a user who is associated with node identification information n1 and a user who is associated with node identification information n2 and a competition between a user who is associated with node identification information n3 and a user who is associated with node identification information n4 according to FIG. 8, and the node identification information n1 to the node identification information n4 are associated with the user identification information u1 to user identification information u4, respectively, according to FIG. 7(B). Start images are therefore distributed to the terminals 102 that are respectively associated with the user identification information u1 to the user identification information u4. Similarly, in the second round of the knockout tournament which is a competition between the user who is associated with the user identification information u1 and the user who is associated with user identification information u3, start images are distributed to the terminals 102 that are respectively associated with the user identification information u1 and the user identification information u3. In the description given above, the users who have lost the first round of the knockout tournament (the users who are associated with the user identification information u2 and the user identification information u4) do not watch the second round of the knockout tournament. In the case where these users wish to watch the second round, however, start images may be transmitted also to the terminals 102 that are associated with these users. The terminals 102 to which start images are transmitted are hereinafter referred to as target terminals 102.

Each target terminal 102 displays a start image based on the distributed start image information. The start image information is, for example, stored in a start image storing unit 513 in association with the game identification information and obtained by the start image distributing unit 512 based on the game identification information of the selected game.

The start image storing unit 513 may also store, for example, an object image and information on the location of the object image in the start image in association with the start image information. The start image distributing unit 512 in this case generates start image information for displaying the object image in a place indicated by the location information in addition to the start image when the start image information is reproduced, and distributes the generated start image information. The object image may have audio information or may be an animated image, for example.

A concrete description is given taking as an example a case where the selected game is a racing game. When a scene prior to the start of the game is the start image described above as illustrated in FIG. 9(A) and an object image depicting a traffic signal is added as illustrated in FIG. 9(B), for example, the start image distributing unit 512 generates an image in which the object image of FIG. 9(B) is superimposed over the start image illustrated in FIG. 9(A) at a place indicated by the location information of the object image (FIG. 9(C)), and distributes the generated image to the associated target terminal 102. The object image depicting a traffic signal may be, for example, an animated image of a traffic signal which changes from red to green in step with audio countdown. The start image storing unit 513 stores a start image in advance in the case described above. The information processing system may instead be configured so that start images, too, are generated as a result of the virtual machines 104, which are described later, respectively starting the execution of a program.

The virtual machine allocating unit 514 allocates one of the virtual machines 104 to each target terminal 102, and transmits the identification information of a selected game to each virtual machine 104. The virtual machine allocating unit 514 may further transmit, depending on which play format or the like is selected, the group information, opponent information, or individual vs. individual knockout tournament information described above (hereinafter referred to management information), and others along with the selected play format or the like. This enables each virtual machine 104 to keep track of which game and which play format have been selected, user identification information, and the like. The virtual machine control unit 515 controls the virtual machine 104 allocated to each target terminal 102.

Specifically, in the case where 1P play is selected, for example, the virtual machine allocating unit 514 allocates one of the virtual machines 104 to the terminal 102 in question. The virtual machine control unit 515 transmits to the allocated virtual machine 104 relevant information including the game identification information of the selected game and user identification information, and instructs the virtual machine 104 to start the execution of a game program that has the transmitted game identification information. The virtual machine 104 responds to the instruction by, among others, starting the execution of the game program with the use of snapshot information stored in association with the game program. Details of how the virtual machine 104 responds to the instruction are described later.

In the case where individual vs. individual one-shot play is selected, the virtual machine allocating unit 514 allocates one of the virtual machines 104 to each terminal 102 that is associated with a user who is selected as an opponent based on the opponent information, for example. Specifically, in the case of FIG. 7(A) where the user identification information u1 to the user identification information u3 are stored as the opponent information, the virtual machines 104 are allocated to the terminals 102 that are respectively associated with the user identification information u1 to the user identification information u3. The virtual machine control unit 515 transmits the game identification information of the selected game, user identification information, and the like to each allocated virtual machine 104, and instructs the virtual machine 104 to start the execution of a game program that has the transmitted game identification information in synchronization with other virtual machines 104. Multiple users can thus participate in individual vs. individual one-shot play simultaneously.

In the case where individual vs. individual knockout tournament play is selected, the virtual machine allocating unit 514 allocates the respective virtual machines 104 based on the individual vs. individual knockout tournament information, for example. A concrete description is given taking as an example a case where the individual vs. individual knockout tournament information is as illustrated in FIG. 7(B) and FIG. 8, the game program to be executed is about one course of a race, and the virtual machines 104 start and end the game program for the one course. The first round of the knockout tournament (a round having "1" as round identification information) is made up of a competition between the user who is associated with the user identification information u1 and the user who is associated with the user identification information u2 and a competition between the user who is associated with the user identification information u3 and the user who is associated with the user identification information u4. The virtual machine control unit 515 therefore instructs the virtual machines 104 that are respectively associated with the user identification information u1 to the user identification information u4 to start the game program in synchronization with one another. In the second round which is a competition between the user who is associated with the user identification information u1 and the user who is associated with the user identification information u3, the virtual machine control unit 515 instructs the virtual machines 104 that are respectively associated with the user identification information u1 and the user identification information u3 to start the execution of the game program in synchronization with each other. In this case, the information processing system may be configured so that the virtual machines 104 that are respectively associated with the user identification information u1 and the user identification information u3 are instructed to transmit image information resulted from the execution of the game program to the terminals 102 that are respectively associated with the user identification information u2 and the user identification information u4 in order to allow the user who is associated with the user identification information u2 and the user who is associated with the user identification information u4 to watch the second round of the knockout tournament (a round having "2" as round identification information). It should be understood that, while the description given above deals with an example in which the knockout tournament has two rounds, the same processing as the one described above is executed for a knockout tournament that has three rounds, four rounds, or more.

In the case where group vs. group one-shot play is selected, the virtual machine allocating unit 514 allocates the respective virtual machines 104 based on group competition information, and the virtual machine control unit 515 controls the virtual machines 104 in a manner determined by the group competition information. A concrete description is given taking as an example a case where the group competition information is as illustrated in FIG. 7(C), the game program to be executed is about one course of a race, and the virtual machines 104 execute the game program for the one course. In the first round which is a competition between the user who is associated with the user identification information u1 and the user who is associated with the user identification information u3, the virtual machines 104 that are respectively associated with the user identification information u1 and the user identification information u3 are instructed to start the execution of the game program. The information processing system may be configured so that, at this point, these virtual machines 104 are instructed to transmit image information resulted from the execution of the game program to the terminals 102 that are respectively associated with the user identification information u2 and the user identification information u4 in order to allow the user who is associated with the user identification information u2 and the user who is associated with the user identification information u4 to watch the competition between the user who is associated with the user identification information u1 and the user who is associated with the user identification information u3. In the second round which is a competition between the user who is associated with the user identification information u2 and the user who is associated with the user identification information u4, the virtual machines 104 that are respectively associated with the user identification information u2 and the user identification information u4 are instructed to start the execution of the game program. The information processing system may be configured so that, at this point, image information resulted from the execution of the game program is similarly transmitted to the terminals 102 that are respectively associated with the user identification information u1 and the user identification information u3 in order to allow the user who is associated with the user identification information u1 and the user who is associated with the user identification information u3 to watch the competition between the user who is associated with the user identification information u2 and the user who is associated with the user identification information u4.

In the case where group vs. group knockout tournament play is selected, the virtual machine allocating unit 514 allocates the respective virtual machines 104 based on the group competition information and group vs. group knockout tournament information, for example. The virtual machine control unit 515 controls the virtual machines 104 in a manner determined by the group competition information and the group vs. group knockout tournament information. A concrete description is given taking as an example a case where the group competition information and the group vs. group knockout tournament information are as illustrated in FIGS. 7(C) and 7(D), the game program to be executed is one course of a race, and the virtual machines 104 start and end the execution of the game program for the one course. The first round of competitions includes a competition between a group that is associated with group identification information G1 and a group that is associated with group identification information G2 and a competition between a group that is associated with group identification information G3 and a group that is associated with group identification information G4. The virtual machines 104 that are associated with users whose place in priority order is 1 in their respective groups (users who have "1" as priority order identification information) (e.g., the user who is associated with the user identification information u1 and the user who is associated with the user identification information u3) are therefore instructed to start the execution of the game program in synchronization with one another. The next competitions in the first round of competitions are between users whose place in priority order in their respective groups is 2 (e.g., the user who is associated with the user identification information u2 and the user who is associated with the user identification information u4). The virtual machines 104 that are associated with the users who are the second in priority order are therefore instructed to start the game program in synchronization with one another. The second round of competitions includes a competition between G1 and G3. The virtual machines 104 that are associated with users of G1 and G3 who are the first in priority order in their respective groups (e.g., the user who is associated with the user identification information u1) are therefore instructed to start emulation in synchronization with each other. Subsequently, the same processing is executed until the knockout tournament is completed.

The configuration of the management server 103 is not limited to the one described above, and may be replaced with substantially the same configuration, a configuration that provides the same actions and effects, or a configuration that accomplishes the same object as the one described above. For instance, the present invention is not limited to the individual vs. individual one-shot play, individual vs. individual knockout tournament play, group vs. group one-shot play, group vs. group knockout tournament play, and other play formats described above which are given as an example.

For instance, the knockout tournament play described above may be replaced by other formats such as round-robin tournament, Swiss-style tournament, double elimination tournament, and step ladder tournament. Users participating in a knockout tournament or the like compete for scores earned by the users in the game, the score within a given period of time, the time required to reach a certain point, these scores and time compiled on a group basis, and the like. The description given above deals with an example in which the competitors are two users for each competition in each round of a knockout tournament. Alternatively, the competitors of each competition in each round may be less than or more than two users, and the knockout tournament chart may have a different format. While the description given above deals with an example in which the virtual machines 104 execute a game program in synchronization with one another for individual vs. individual one-shot play that is played by a plurality of users, the game program may be executed asynchronously (e.g., a user competes against a video recorded in advance) as described later. The management server 103 may have, for example, a time management unit configured to manage for each user the length of time from the start to end of the utilization of a game program as the one described above in addition to the components described above. With the time management unit, the management server 103 may generate and hold charging information based on the managed time, or may manage the utilization fee of each user on a monthly basis.

Figure 10:
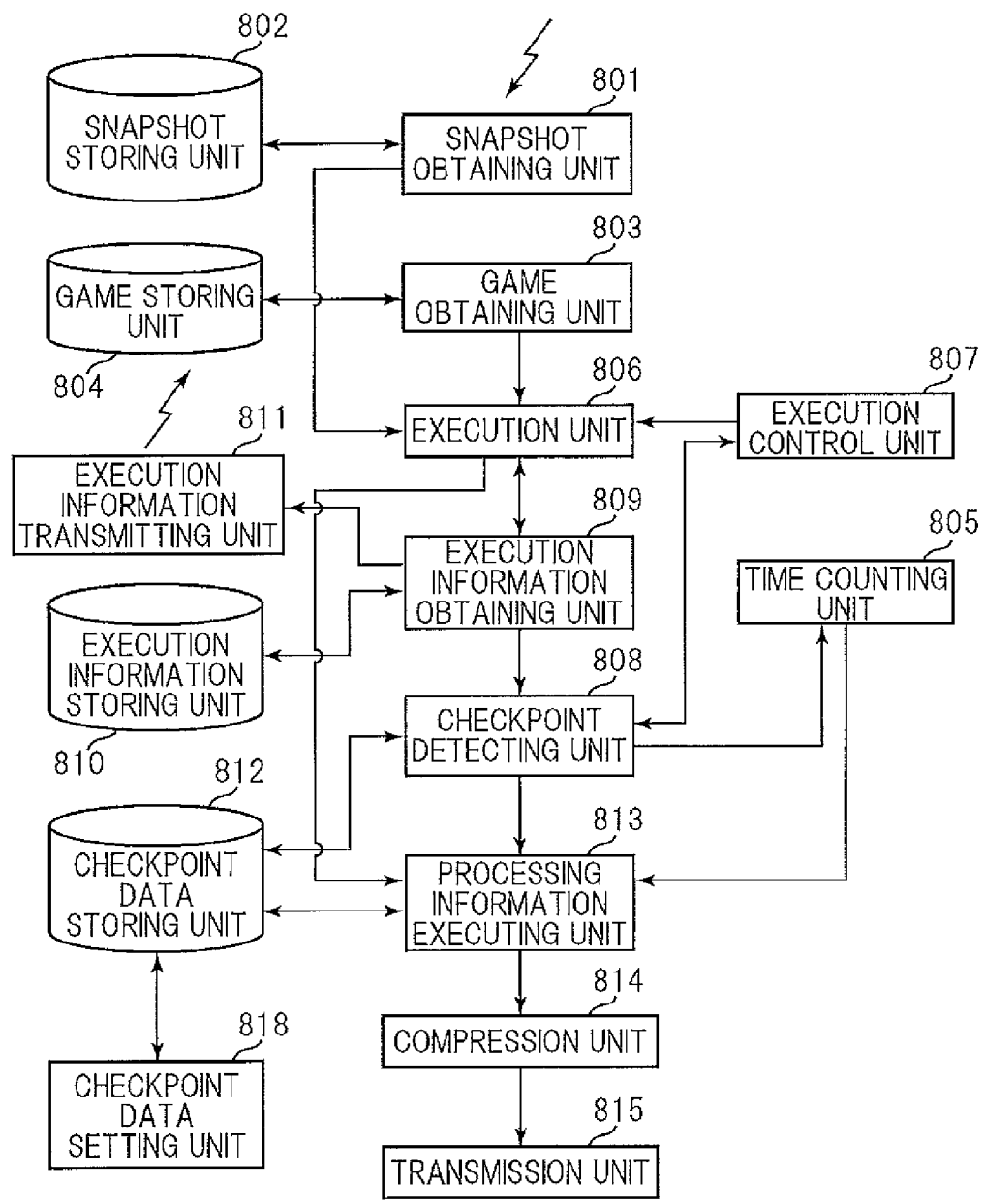
[FIG. 10] A diagram illustrating the functional configuration of each virtual machine in the embodiment.

The functional configuration of each virtual machine 104 is described next with reference to FIG. 10. As illustrated in FIG. 10, each virtual machine 104 includes, for example, a snapshot obtaining unit 801, a game obtaining unit 803, a time counting unit 805, the execution unit 806, an execution control unit 807, a checkpoint detecting unit 808, an execution information obtaining unit 809, a processing information executing unit 813, a compression unit 814, a transmission unit 815, and a checkpoint data setting unit 818.

The snapshot obtaining unit 801 obtains the game identification information of a selected game from the management server 103 and, based on the game identification information, obtains from a snapshot storing unit 802 snapshot information that is stored in association with the game identification information. The snapshot information indicates the execution state (values in a memory, values of a register or a program counter, or the like) of a game machine which is reproduced by the execution unit described later, i.e., an emulator or a simulator. In the case where a game machine is installed, the snapshot information indicates the execution state of the game machine. The snapshot storing unit 802 corresponds to, for example, one of the databases 105 illustrated in FIG. 1. The snapshot information may be stored also in association with the above-mentioned user identification information of a user and rank information of the user, so that the snapshot obtaining unit 801 obtains the snapshot information based on user identification information and rank information that are obtained from the management server 103. In this case, for example, a handicap can be assigned to each user separately, such as letting a low-rank user start from a point in a course ahead of a high-rank user in a competition between the low-rank user and the high-rank user which is set in one course of a racing game.

The game obtaining unit 803 obtains the game identification information of a selected game program from the management server 103 and, based on the game identification information, obtains the associated game program from a game storing unit 804. The game storing unit 804 corresponds to, for example, one of the databases 105 illustrated in FIG. 1.

The time counting unit 805 counts a time set in advance, for example, the time elapsed from the start of the execution of a game program by the execution unit 806 which is described later, or the length of time from the detection of one checkpoint to the detection of another checkpoint by the checkpoint detecting unit 808. The time counting unit 805 may be configured so as to start or end counting time in response to an instruction from a user.

The execution unit 806 executes a game program obtained by the game obtaining unit 803 under control of a control signal from the execution control unit 807. The execution control unit 807 controls the execution of a game program by the execution unit 806. To give a concrete example, the execution control unit 807 instructs the execution unit 806 to start executing a game program in response to a game program execution starting instruction from the management server 103 when the multi-player format described above is selected, or instructs the execution unit 806 to stop the execution of a game program when the checkpoint detecting unit 808 described later detects the final checkpoint (e.g., a goal screen of a racing game). The execution unit 806 uses the snapshot information obtained by the snapshot obtaining unit 801 when, for example, starting the execution of the game program. This way, the game program can be started from, for example, a given stage which is determined in advance. The execution unit 806 corresponds to, for example, an emulator or simulator of a game machine that is targeted for the game program, of the game machine itself.

The execution information obtaining unit 809 obtains execution information, which is generated as a result of the game program execution by the execution unit 806. The execution information includes, among others, image information, animated image information, and audio information generated by executing a game program, and information indicating the internal state of the execution unit 806 (values in a memory, values of a register or a program counter, or the like). The execution information obtaining unit 809 may also be configured so as to, for example, obtain execution information from an execution information storing unit 810 in response to an instruction from a user, or may be configured to obtain execution information from the execution information obtaining unit 809 of another virtual machine 104. In this case, for example, the information processing system can upload a play scene by using execution information of the same user or another user and execute a game from the play scene. The execution information stored in the execution information storing unit 810 corresponds to, for example, execution information that is generated by the execution unit 806 of the same virtual machine 104 or another virtual machine 104. In the case where the same game is played by a plurality of users in individual vs. individual one-shot play or the like and one of the users issues an instruction to suspend the game (e.g., the press of a pause button), for example, the execution information storing unit 810 may store execution information that precedes the suspension so that, after an instruction to resume the game is issued, the game can be resumed based on the execution information at the time of suspension. In this case, the information processing system may be configured so that which user is allowed to issue the suspension instruction and the resumption instruction is set in advance.

The execution information transmitting unit 811 transmits, for example, image information that is included in execution information obtained by the execution information obtaining unit 809 to the management server 103. The management server 103 transmits the image information as described above to, for example, the terminal 102 that is associated with a user who has selected game watching as the play format. The execution information transmitting unit 811 may transmit the image information directly to the terminal 102 that is associated with a user who has selected game watching as the play format, without the involvement of the management server 103. This enables the user to watch a game played by other users, for example.

Based on the execution information described above, the checkpoint detecting unit 808 detects a checkpoint set in advance, and transmits the address of processing information that is associated with the detected checkpoint, along with checkpoint identification information for identifying the checkpoint, to the processing information executing unit 813.

Figures 11, 12:
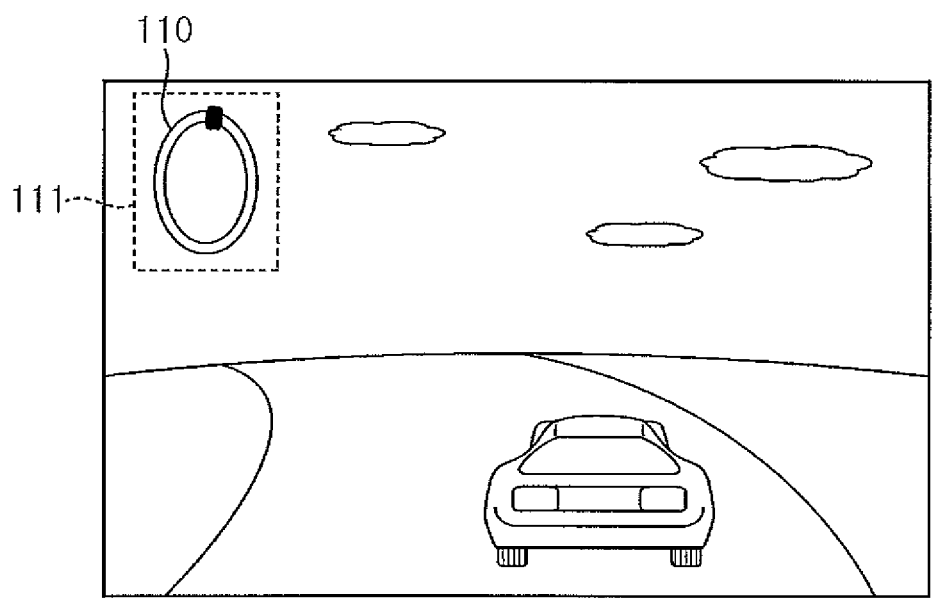
[FIG. 11] A diagram illustrating the storage format of a checkpoint data storing unit in the embodiment.
[FIG. 12] A diagram illustrating checkpoint detection in the embodiment.

To give a concrete example, the checkpoint detecting unit 808 obtains the address of condition information for detecting a checkpoint and a processing information address from a checkpoint data storing unit 812 based on the game identification information of a selected game. The checkpoint data storing unit 812 stores, for example, game identification information, a condition information address, and a processing information address in a table format as illustrated in FIG. 11. Based on the game identification information of a selected game, the checkpoint detecting unit 808 obtains a condition information address of the game and determines whether or not the execution information matches condition information that is stored at the obtained condition information address. In the example of FIG. 11, when the identification information of the selected game is g1, the checkpoint detecting unit 808 obtains pieces of condition information that have condition information addresses c1 to c4, and determines for each piece of the obtained condition information whether or not the execution information matches the piece of condition information.

Each piece of condition information is stored in association with one of checkpoints in the game program that is being executed, for example, a scene or action set in advance. The checkpoint detecting unit 808 can detect one or a plurality of checkpoints set in advance by determining for each piece of the condition information whether or not the obtained execution state meets a condition that is associated with the piece of condition information.

To give a more detailed description, the condition information includes, for example, a particular pattern or feature amount found in apart of or the entirety of image information, audio information, or the like that is generated by the execution unit 806 under a particular situation, and a particular value of a program counter or a register, and the checkpoint detecting unit 808 determines whether or not execution information generated by the execution unit 806 matches the particular pattern or feature amount, or the like. Whether or not the execution information matches the particular pattern or feature amount, or the like is determined by, for example, determining by the checkpoint detecting unit 808 whether or not the execution information generated by the execution unit 806 is within a given range which is included in the condition information in relation to the particular feature amount or the like. Specifically, the determination uses image recognition, audio recognition, or letter recognition, for example.

A description is given taking as an example a case where the selected game is the racing game described above. In the case where an image showing a race course map 110 is displayed and the location information of an operation target car is displayed in a particular color as illustrated in FIG. 12, for example, the checkpoint detecting unit 808 is configured so as to detect a checkpoint by recognizing, as a feature amount, through image recognition or the like, whether a given point in the image showing the race course map 110 has changed from the color of the course to the particular color. The range of image recognition in this case may be, for example, a range 111 of FIG. 12 which is a part of the display range. The checkpoint detecting unit 808 may also be configured so as to detect a checkpoint by recognizing other particular images, letters, or the like that appear as the racing game progresses through image recognition, letter recognition, or other recognition methods.

When a certain checkpoint is detected by the checkpoint detecting unit 808 (when it is determined that the execution state matches a certain piece of condition information), the processing information executing unit 813 obtains from the checkpoint data storing unit 812 processing information that is stored in association with this checkpoint (condition information) in the checkpoint data storing unit 812. Specifically, the processing information executing unit 813 obtains processing information based on the processing information address obtained from the checkpoint detecting unit 808, and executes processing based on the obtained processing information. This processing is, for example, processing of outputting image information, audio information, or the like, and includes processing for outputting an image, audio, or the like that is based on the processing information in addition to an image, audio, or the like that is generated as a result of game program execution by the execution unit 806, and processing for outputting an image to be displayed after the game is ended. The information processing system may be configured so that, for example, processing information that is associated with the final checkpoint is processing for stopping the game program execution of the execution unit 806. The processing information may be configured so that, for example, rank information of a user is recognized based on a given image or the like and is updated. The processing information may be changed or set by the checkpoint data setting unit 818 in a manner that reflects management information from the management server, an instruction from a user, or the like. The information processing system may also be configured so that, for example, one type of processing is executed for the case of the individual vs. individual one-shot play or individual vs. individual knockout tournament play described above, or a similar play format, whereas different processing is executed for other cases (e.g., the case where 1P play is selected). In this case, different processing information is obtained for a different choice of play format selected from, for example, the play formats described above to execute the relevant processing.

Figures 13, 14:
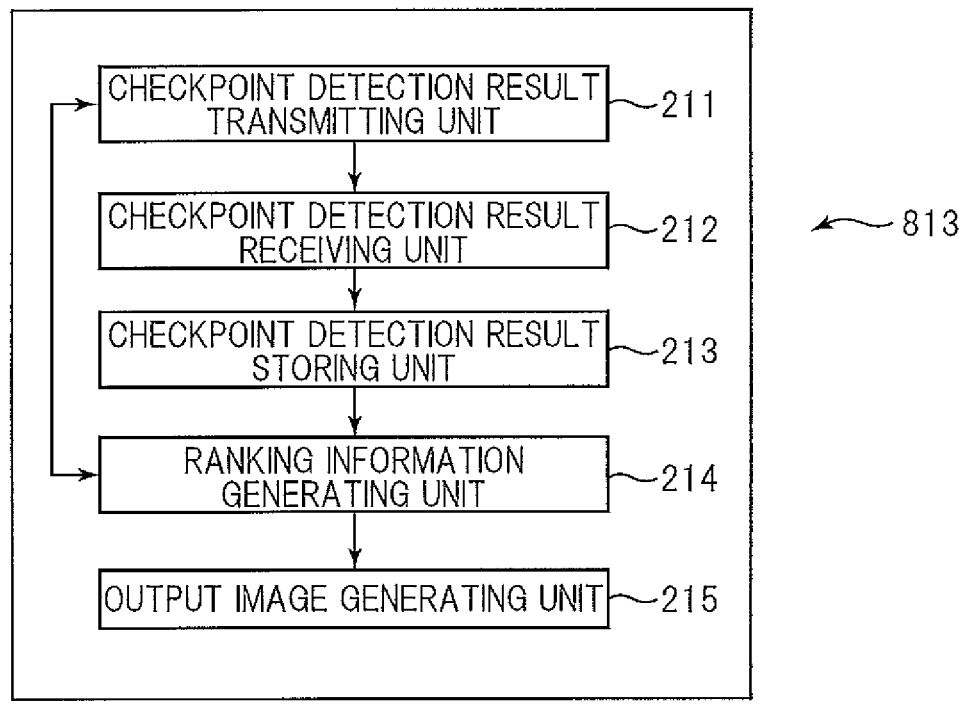
[FIG. 13] A diagram illustrating the functional configuration of a processing information executing unit in the embodiment.
[FIG. 14] A diagram illustrating the storage format of a checkpoint detection result storing unit in the embodiment.

A more detailed description is given with reference to FIG. 13 of an example of the functional configuration of the processing information executing unit 813, taking as an example the case where the game program in question is the racing game described above. A checkpoint detection result transmitting unit 211 transmits information about the result of checkpoint detection (checkpoint detection result information) to other virtual machines 104 or a virtual server. The other virtual machines 104 are, for example, the virtual machines 104 that have started the racing game in synchronization with one another upon instruction from the management server 103.

To give a concrete example, in the case where the multi-player format is selected and the checkpoint detecting unit 808 has detected a checkpoint that is associated with, for example, processing information for displaying a place in the order, the checkpoint detection result transmitting unit 211 transmits to the other virtual machines 104 information about a time at which the checkpoint has been detected and user identification information to which the execution unit 806 of the virtual machine 104 in question is allocated, along with checkpoint identification information for identifying the detected checkpoint (condition information).

In the case where group vs. group one-shot play is selected and the final checkpoint (e.g., a goal screen of a race) is detected, for example, the virtual machine control unit 515 of the management server 103 is notified that the race has ended. This allows the virtual machine control unit 515 to commence processing for holding a competition between users whose user identification information is associated with the next place in the priority order information described above. The same applies to the case of group vs. group knockout tournament play, and a description thereof is omitted.

A checkpoint detection result receiving unit 212 receives checkpoint identification information which is transmitted when the same checkpoint is detected by another virtual machine 104, information about a time at which the checkpoint has been detected, and user identification information allocated to the other virtual machine 104, and stores the received information in a checkpoint detection result storing unit 213.

The checkpoint detection result storing unit 213 also stores checkpoint identification information of a checkpoint detected by the checkpoint detecting unit 808, information about a time at which the checkpoint has been detected, and user identification information allocated to the virtual machine 104. Specifically, the checkpoint detection result storing unit 213 stores these pieces of information in a table format as the one illustrated in FIG. 14, for example.

When a checkpoint in question is detected, a ranking information generating unit 214 refers to checkpoint detection result information stored in the checkpoint detection result storing unit 213 to calculate for each user the user's place in the order. A concrete description is given taking FIG. 14 as an example. The checkpoint detecting unit 808 in this example detects a checkpoint that is indicated by checkpoint identification information a. Stored in the checkpoint detection result storing unit 213 in this case are the user identification information u1 to the user identification information u4 which are associated with the checkpoint identification information a and pieces of time information that are associated with the user identification information u1 to the user identification information u4. The ranking information generating unit 214 compares the pieces of time information that are respectively stored in association with the user identification information u1 to the user identification information u4 to calculate for each user the user's place in the order. The place in the order of the user identification information u4, for example, is thus calculated as the fourth place.

In the case where the individual vs. individual knockout tournament play described above is selected, for example, the ranking information generating unit 214 transmits, to the management server 103, along with game identification information, user identification information for which "1" is stored in the checkpoint detection result storing unit 213 as ranking information at the final checkpoint (e.g., a goal screen of a race). The management server 103 can obtain a combination of competitors for a competition in the next round based on the received user identification information. A concrete description is given taking as an example the first round of the individual vs. individual knockout tournament play of FIG. 7(B). As described above, in the first round of this example, where the user who is associated with the user identification information u1 and the user who is associated with the user identification information u2 compete against each other, and the user who is associated with the user identification information u3 and the user who is associated with the user identification information u4 compete against each other, the virtual machines 104 that are respectively associated with the user identification information u1 and the user identification information u2 transmit the user identification information u1, and the virtual machines 104 that are respectively associated with the user identification information u3 and the user identification information u4 transmit the user identification information u3. The updating unit 507 of the management server 103 thus obtains pieces of user identification information of winners who proceed to the second round (the user identification information u1 and the user identification information u3), and stores the user identification information u1 and the user identification information u3 in spaces in the table for pieces of user identification information that are associated with round identification information "2". In the example described above, the virtual machines 104 transmit the user identification information u1 and the user identification information u3 to the management server 103 in a duplicate manner. Alternatively, only one virtual machine 104 in each competition may transmit the user identification information of the winner out of a plurality of virtual machines 104 associated with the competition.

Figure 15:
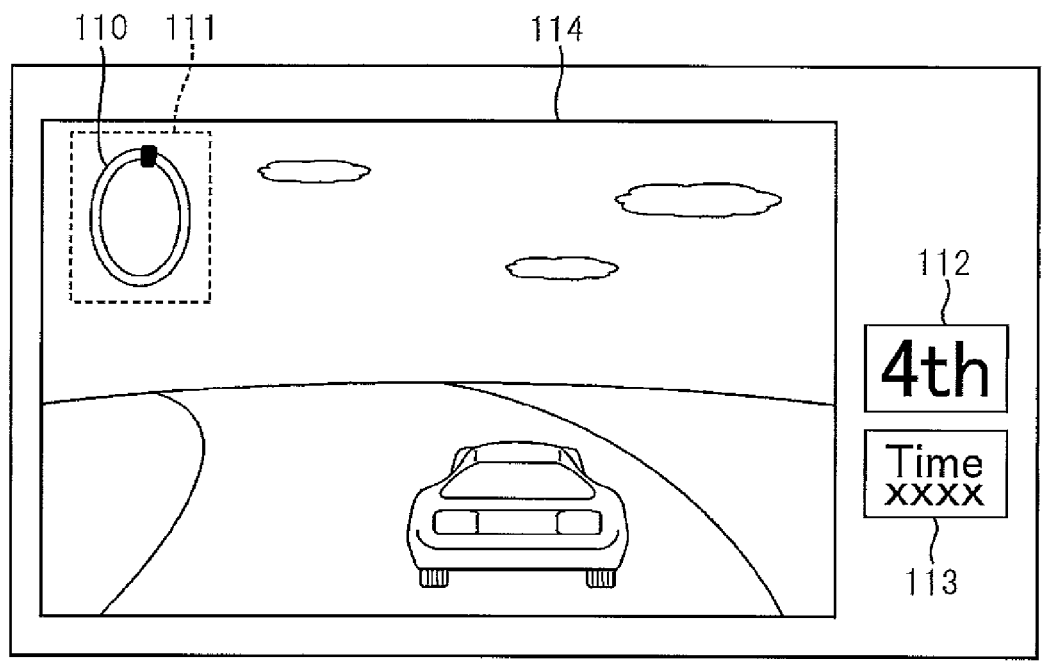
[FIG. 15] A diagram illustrating output information in the embodiment.

An output image generating unit 215 generates an output image that suits the processing information described above. In the case where processing information associated with one checkpoint is about displaying how long it has been from the start of a race, for example, the output image generating unit 215 obtains from the time counting unit 805 information about the time elapsed since the start of the race, and generates image information for displaying an image 113 of FIG. 15 which shows the elapsed time in addition to an image 114 which is based on game program execution of the execution unit 806. In the case where the processing information is about displaying a place in the order as the one described above, for example, the output image generating unit 215 generates, based on finishing order information from the ranking information generating unit 214, image information for displaying an image 112 which shows the place in the order of a user who is associated with the virtual machine 104 in question in addition to the image 114 which is based on game program execution of the execution unit 806. In the case where individual vs. individual one-shot play or a similar play format is selected, for example, the output image generating unit 215 may generate image information for displaying image information that is generated by the execution units 806 of the virtual machines 104 that are being executed in synchronization with one another in addition to an image 190 of FIG. 16 which is based on game program execution of its own execution unit 806.

Figures 17, 18:
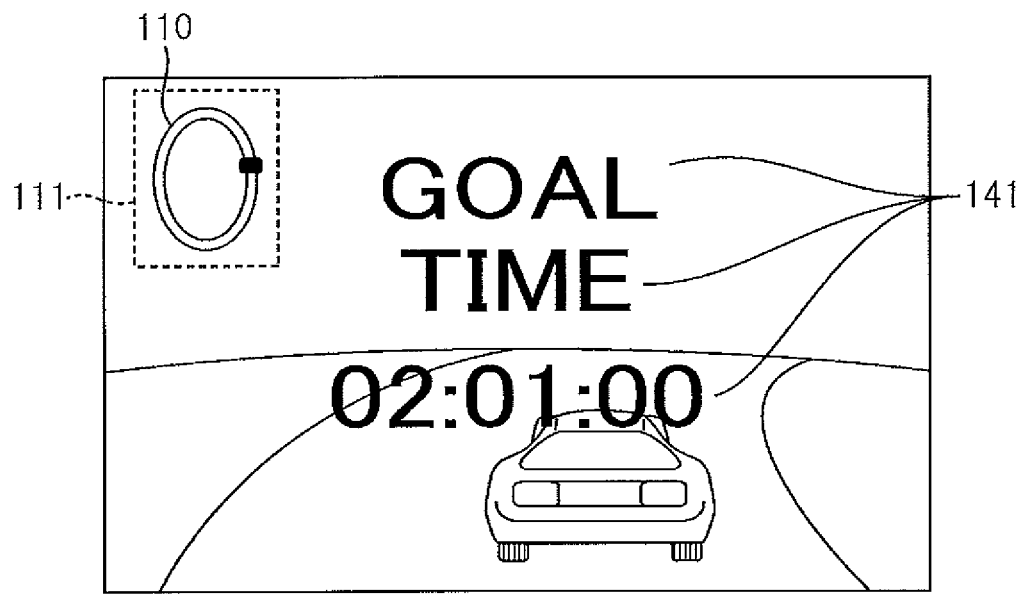
[FIG. 17] A diagram illustrating an example of what is displayed when a final checkpoint is detected in the embodiment.
[FIG. 18] A diagram illustrating an example of a ranking screen in the embodiment.

In the case where the final checkpoint is detected, for example, the output image generating unit 215 generates image information for displaying the time of goal in addition to letters "GOAL TIME" so as to be superimposed over an image from the execution unit 806 as illustrated in FIG. 17, and next generates image information for displaying a ranking screen as the one illustrated in FIG. 18.

As the image information for displaying the image of FIG. 17, the processing information executing unit 813 in this case generates, for example, image information (corresponding to the image of FIG. 17) for superimposing the elapsed time that is supplied from the time counting unit 805 over an image of image information that is generated by the execution unit 806. As the image information for displaying the image of FIG. 18, image information for displaying a screen of the ranking of users is generated based on ranking that is calculated for each user by the ranking information generating unit 214 based on, for example, time information and user identification information that are stored in the checkpoint detection result storing unit 213 in association with final checkpoint identification information. The image information generated at this point is not limited to that of FIG. 18 and may be other types of image information. To give a concrete example, the names of groups to which users belong, a list of scores, score histories, results of competitions in other knockout tournaments, and other types of relevant information may be displayed in addition to or separate from the image of FIG. 18.

The compression unit 814 compresses image information generated by the execution unit 806 or image information generated by the output image generating unit 215, and the transmission unit 815 transmits the compressed image information to the relevant terminal 102. The transmission unit 815 specifically transmits the compressed image information to, for example, a terminal that is associated with a user who is actually playing a game program via its own virtual machine 104 and a terminal that is associated with a user who wishes to watch the game program as well.

This embodiment is not limited to the configuration described above, and is receptive to various modifications. For instance, the configuration described above can be replaced with substantially the same configuration, a configuration that provides the same actions and effects, or a configuration that accomplishes the same object as the one described in the embodiment. To give a concrete example, the compression unit 814 may be omitted so that the image information is transmitted to the relevant terminal 102 without being compressed. The virtual machine (s) 104 may be replaced with physical machines 402. The management server 103 and the database (s) 105, too, may be constructed from the virtual machine (s) 104. The functions of the management server 103, each virtual machine 104, and each database 105 that have been described are given as an example, and the present invention is not limited thereto. Various modifications can be made to the embodiment such as giving some or all of the functions of the management server 103 to each virtual machine 104, or giving some or all of the functions of each virtual machine 104 to the management server 103 or each terminal 102.

Figure 19:
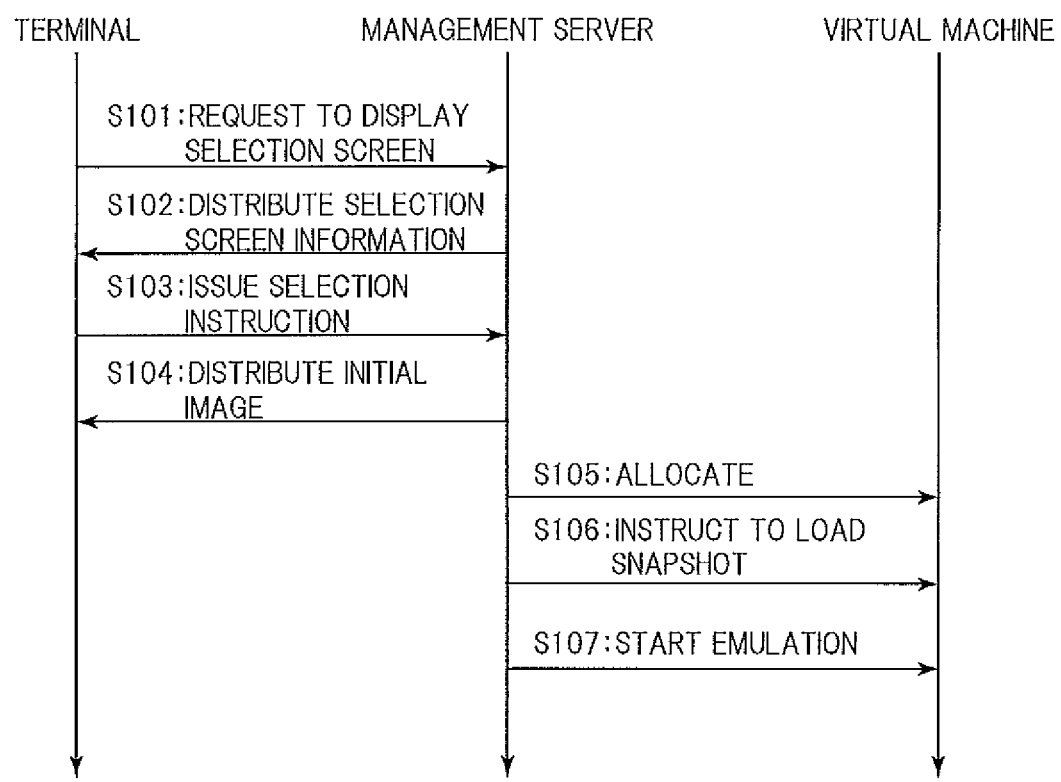
[FIG. 19] A diagram illustrating the flow of processing that is performed by each terminal, the management server, and each virtual machine until the execution of a game program is started.

A description is given next with reference to FIG. 19 of an example of processing that is performed by each terminal 102, the management server 103, and each virtual machine 104 until the execution of a game program by the execution unit 806 is started. The following description deals with a case where users select the same race game described above on their respective terminals 102, and the multi-player format is selected.

The users respectively request the management server 103 to display a selection screen from their respective terminal 102 via the network 101 (S101). The management server 103 distributes image information for constructing the selection screen to each of the terminals 102 (S102). The video information or the like is distributed by, for example, so-called streaming, and the terminals 102 display the image information with the use of an image reproducing program or the like. Details of streaming distribution are well known and a description thereof is therefore omitted.

The users respectively transmit instructions for selecting a desired game from their respective terminals 102 via the network 101 (S103). The management server 103 next transmits to the terminals 102 start image information that is stored in association with the game identification information of the game selected by the plurality of users (S104). As described above, a start image displayed on the terminals 102 from the start image information is, for example, the initial image of FIG. 9(A), or the image of FIG. 9(C) in which an object image relevant to the start image is superimposed.

The management server 103 allocates the virtual machines 104 to the respective terminals 102 (S105). At this point, the user identification information for identifying the respective users who operate the terminals 102 may additionally be transmitted to the virtual machines 104 as described above. The management server 103 next instructs the virtual machines 104 to load snapshot information that is stored in association of the game identification information (S106). Based on the instruction, the virtual machines 104 respectively load the snapshot information from the snapshot storing unit 802. The management server 103 next instructs the virtual machines 104 to start the emulation of the game program (S107). The execution units 806 of the respective virtual machines 104 execute the game program in synchronization with one another.

Figure 20:
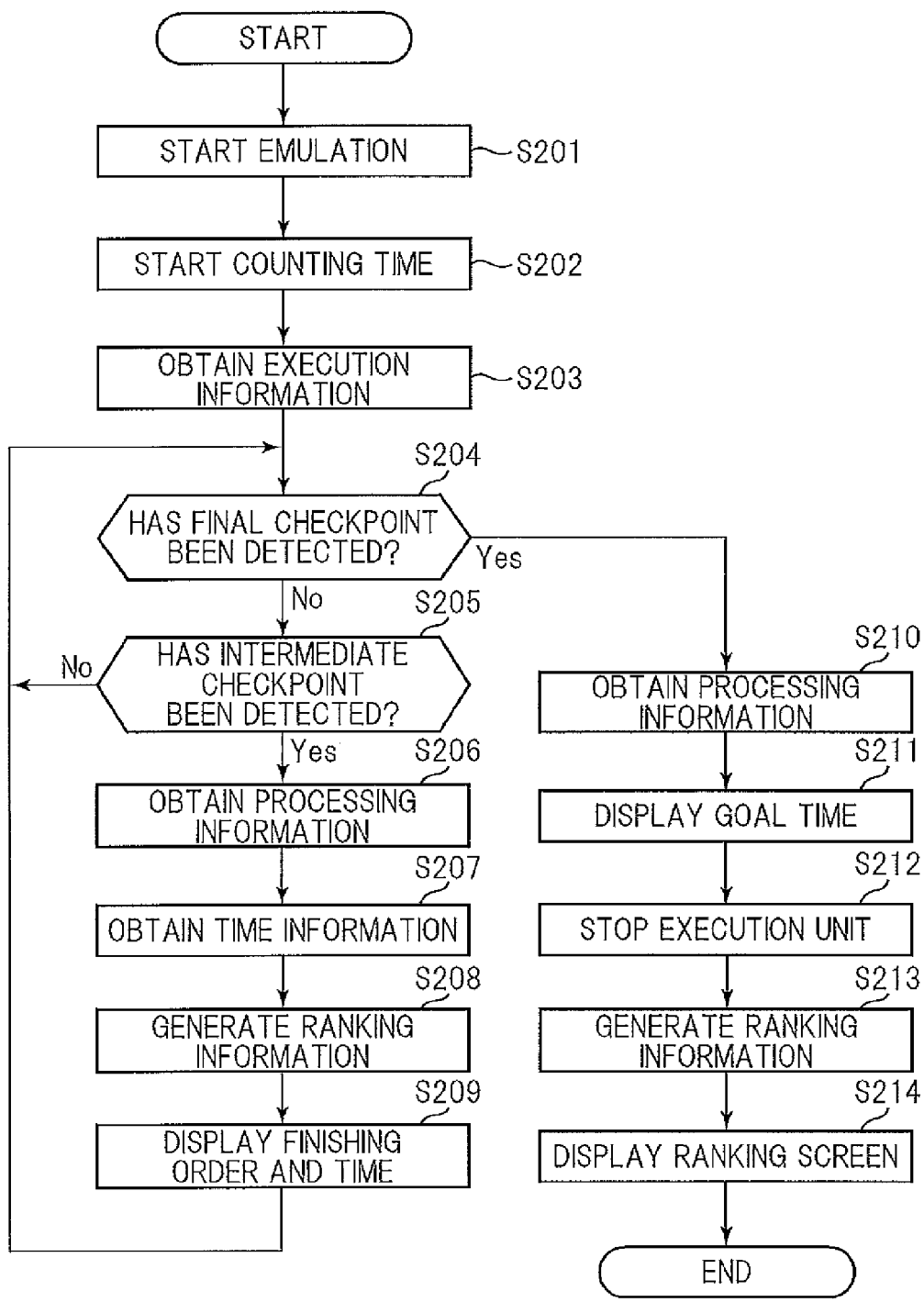
[FIG. 20] A diagram illustrating the flow of processing that is performed by each virtual machine after the execution of the game program is started.

Described next with reference to FIG. 20 is an example of the flow of processing that is performed by each virtual machine 104 after the execution unit 806 starts the execution of a game program. This description of the processing flow takes as an example a case where the selected game is the racing game described above and the multi-player format is selected.

The execution unit 806 starts the execution (e.g., emulation) of the selected game program (S201). The time counting unit 805 at this point begins counting the time that has elapsed since the start of the game program execution (S202). The execution information obtaining unit 809 starts obtaining execution information from the execution unit 806 (S203). Based on the obtained execution information, the checkpoint detecting unit 808 determines whether or not a detected checkpoint is the final checkpoint (S204). When it is determined that the detected checkpoint is not the final checkpoint, the processing proceeds to S205.

The checkpoint detecting unit 808 determines whether or not a detected checkpoint is an intermediate checkpoint (S205). When it is determined that the detected checkpoint is an intermediate checkpoint, processing information that is stored in association with the intermediate checkpoint is obtained (S206). Based on the processing information, the processing information executing unit 813 obtains time information (S207). The processing information executing unit 813 also generates ranking information based on the processing information (S208). The processing information executing unit 813 generates an output image using the time information and the ranking information, and outputs the generated output image to the terminal 102 that is allocated to the virtual machine 104 in question (S209). The processing then returns to S204.

When it is determined that the detected checkpoint is the final checkpoint, on the other hand, processing information that is stored in association with the final checkpoint is obtained (S210). Based on the processing information, the processing information executing unit 813 obtains time information from the time counting unit 805, uses the time information to generate an output image, and outputs the generated output image to the terminal 102 that is allocated to the virtual machine 104 in question (S211). The execution unit 806 is then stopped (S212). The processing information executing unit 813 generates ranking information based on the processing information (S213). The processing information executing unit 813 generates ranking image information by using the time information and the ranking information, and outputs the generated ranking image information to the terminal 102 that is allocated to the virtual machine 104 in question (S214). The processing is then ended.

The processing flow described above is given as an example, and various modifications can be made. For instance, the order of the steps may be rearranged as long as substantially the same processing, processing that provides the same actions and effects, or the same object as the one described in the embodiment is accomplished. In the description given above, one intermediate checkpoint is set. The information processing system may instead be configured so that different processing is set to and executed for each of a plurality of intermediate checkpoints. The description given above takes as an example a racing game that is played when the multi-player format is selected to discuss a configuration in which a time and finishing order are displayed. Alternatively, other types of information may be displayed, or a given piece of music or a given animated image may be reproduced, in response to the detection of each checkpoint.

According to the embodiment described above, a new function can be added without altering an application program that is created to be executed on a dedicated device. For example, a match play function can be added to a video game that does not have a match play function.

The present invention is not limited to the embodiment described above, and is receptive to various modifications. For instance, the configuration of the embodiment can be replaced with substantially the same configuration, a configuration that provides the same actions and effects, or a configuration that accomplishes the same object as the one described in the embodiment. To give a concrete example, while the description given above mostly takes as an example a case where the selected game is a racing game, the present invention may be applied to video games of other types such as shooting games and role-playing games. In the case of a shooting game, for example, a stage which is a part of the game is prepared, a letter string or the like that appears when the stage is cleared is detected, and which of a plurality of players has the highest score and a time required for each player to finish the stage may be displayed after the game is ended.

The description given above deals with a configuration in which a particular letter or image is recognized. In given processing, for example, breakout or a similar game, the number of blocks that have been cleared out in succession or the like may be recognized instead through image recognition or other recognition methods in order to output a ranking image or the like based on the number.

In the case of a role-playing game, for example, a particular character may be recognized through image recognition or the like so that information about the particular character (e.g., information about weak points of the character) is displayed when the character appears on the screen. The information processing system in this case may be configured so as to directly store, for example, an image address of image information containing this information in association with a condition information address, instead of the processing information of FIG. 11, and to display image information that is stored at the image address.

The information processing system may also be configured so as to allow one or a plurality of players to compete against one or a plurality of players asynchronously when the selected play format is a format that includes a competition between users, such as individual vs. individual one-shot play or individual vs. individual knockout tournament play. A concrete description is given with reference to FIG. 21 of a modification example that deals with this case. The description of this modification example, too, discusses a case where the racing game described above is selected.

Figure 21:
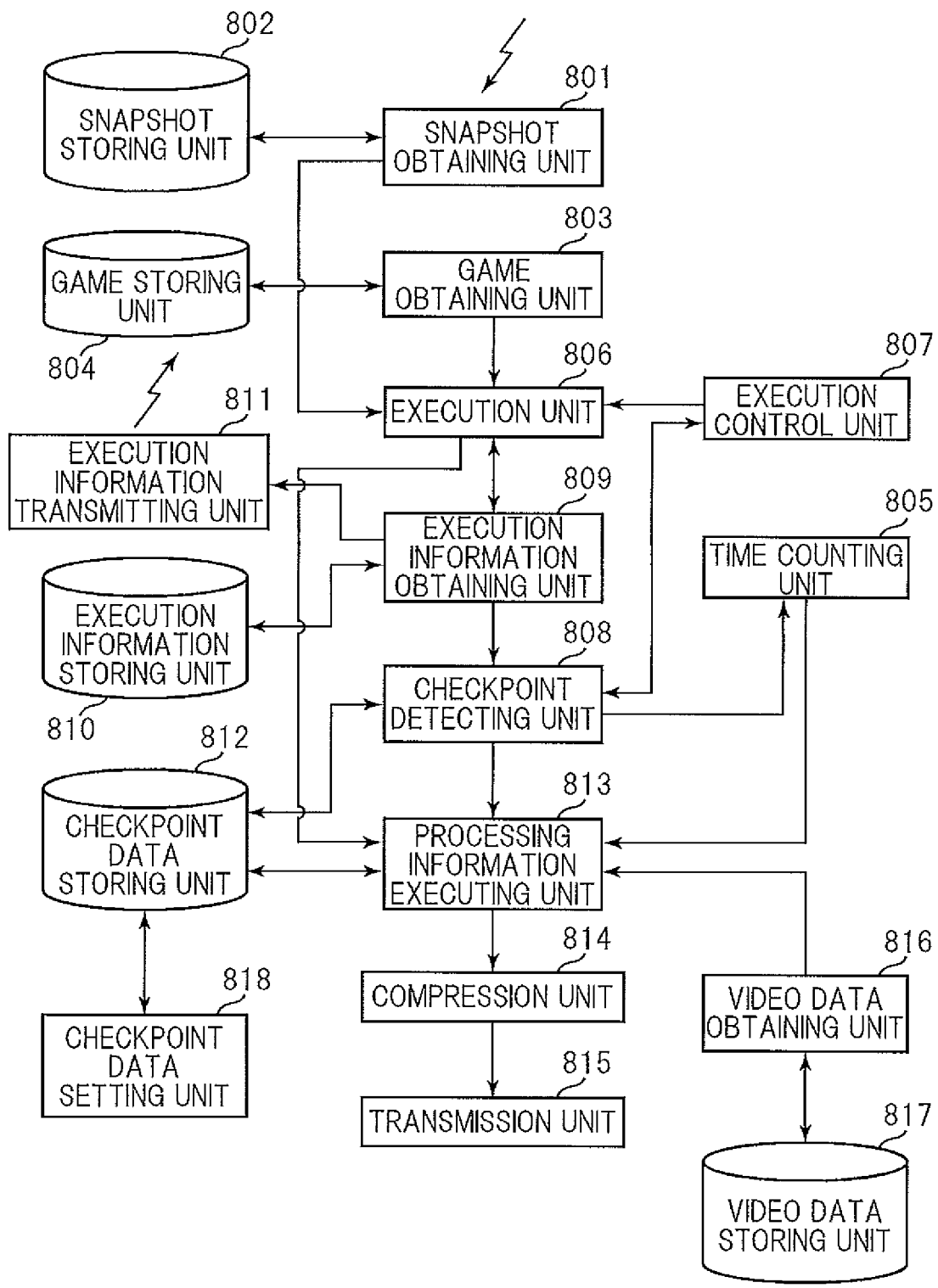
[FIG. 21] A diagram illustrating the functional configuration of a virtual machine in a modification example of the present invention.

As illustrated in FIG. 21, each virtual machine 104 in this modification example additionally includes a video data obtaining unit 816. Video data obtained by the video data obtaining unit 816 is, for example, one or a plurality of pieces of video data (e.g., video information recorded in advance) out of video data that is generated as a result of the execution of the racing game by the execution unit 806 and that is stored in, for example, a video data storing unit 817. The video data storing unit 817 corresponds to, for example, one of the databases 105. The video data obtaining unit 816 obtains the video data from the database 105 or the like when, for example, instructed by the execution control unit 807 in response to the selection of the racing game, and transmits the obtained video data to the processing information executing unit 813. The selection screen described above may display information about the one or plurality of pieces of video data, for example, a lap time and a player name, so that the user can refer to this information in selecting one or plurality of desired pieces of video data. The video data storing unit 817 may store video data that is based on a user's play in response to a play recording instruction, checkpoint specification, or the like that is given by the user, so that the user or a third party can view the stored video data. The video data storing unit 817 in this case may be configured so that the video data can be deleted upon instruction from the user or the like.

Figure 16:
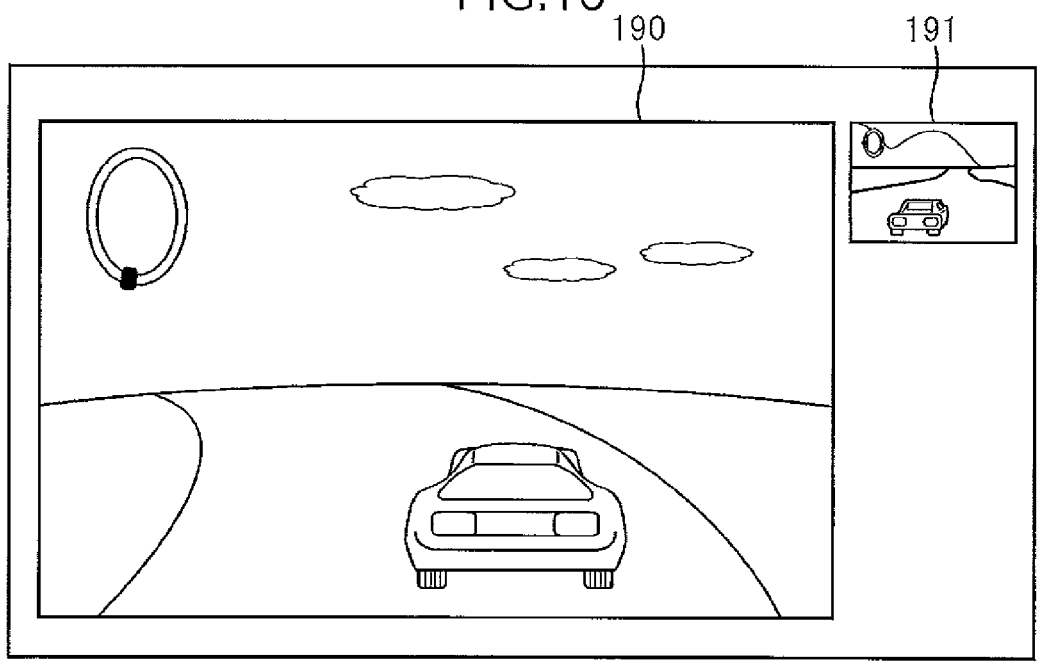
[FIG. 16] Another diagram illustrating the output information in the embodiment.

The processing information executing unit 813 generates image information based on the video data, and generates image information in which the image information based on the video data is added to image information of the racing game that results from the game program execution of the execution unit 806. The generated image information is transmitted to the relevant terminal 102 and is displayed by the display unit 204 of the terminal 102 as in the embodiment. An example of what is displayed by the display unit 204 at this point is illustrated in FIG. 16. An image 191 based on video data is displayed to, for example, the upper right of an image 190 of the racing game which is based on the game program execution of the execution unit 806 as illustrated in FIG. 16. The present invention is not limited to the configuration of FIG. 16 in which the image 191 based on one piece of video data is displayed, and an image based on a plurality of pieces of video data may be displayed.

Figure 22:
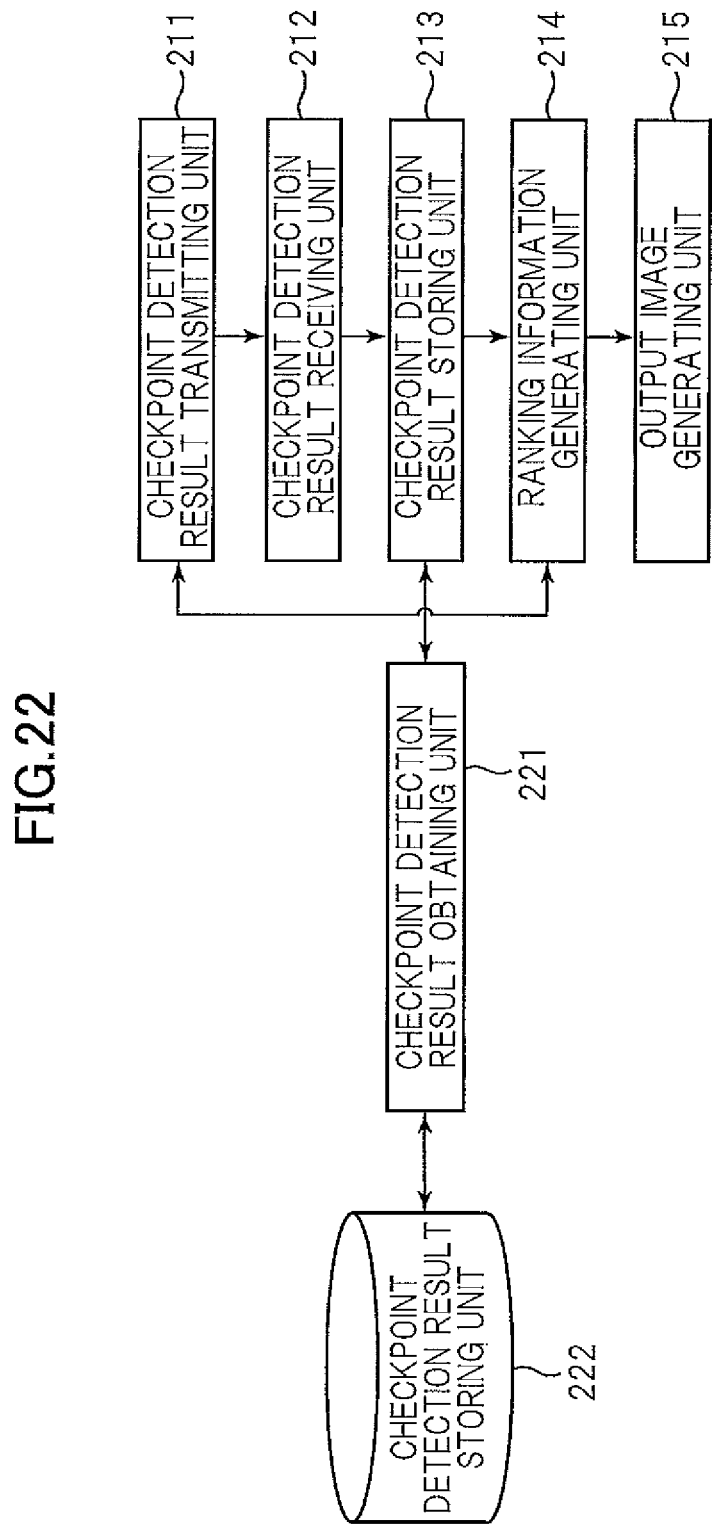
[FIG. 22] A diagram illustrating the functional configuration of a processing information executing unit in the modification example of the present invention.

A description is given of the functional configuration of the processing information executing unit 813 that is involved in the generation of ranking information in this modification example. As illustrated in FIG. 22, the processing information executing unit 813 has a checkpoint detection result obtaining unit 221 to obtain, from a checkpoint detection result storing unit 222, identification information of a checkpoint detected by the checkpoint detecting unit 808 which has been stored in association with video data in question. The checkpoint detection result obtaining unit 221 also obtains from the checkpoint detection result storing unit 222 time information about a time at which the checkpoint has been detected, and user identification information allocated to the relevant virtual machine 104. The obtained information is stored in the other checkpoint detection result storing unit, 213. The checkpoint detection result storing unit 222 corresponds to, for example, one of the plurality of databases 105. The processing information executing unit 813 then generates ranking information based on the information stored in the checkpoint detection result storing unit 213 as in the embodiment.

The rest of the configuration of this modification example and details of processing flow in this modification example are the same as those of the embodiment, and a description thereof is therefore omitted. According to this modification example, a player can play a racing game quasi-synchronously with other players as in the embodiment, although it is asynchronous in actuality.

The present invention is not limited to the embodiment and modification example described above, and is receptive to various modifications. For instance, the configurations of the embodiment and the modification example can be replaced with substantially the same configurations, configurations that provide the same actions and effects, or configurations that accomplish the same object as the one described in the embodiment and the modification example. To give a concrete example, the present invention may have a configuration that is obtained by combining the embodiment and the modification example as long the two do not contradict each other. In this case, the information processing system allows some players to play synchronously and other players to play quasi-synchronously when it is actually asynchronous. The present invention is also not limited to cases of using a game program which have been described in the embodiment and the modification example, and may be applied to other application programs than game programs. The description given above mostly deals with a case where the same game program is executed for a plurality of players in the multi-player format, the individual vs. individual knockout tournament play format, or a similar format. It should be understood, however, that the present invention is not limited thereto and different application programs may be executed on a plurality of virtual machines 104.

The time counting unit 815 may measure, for example, the length of a period in which no operation instructions are issued by the user of its own virtual machine 104 (a log-out period). When the measured length of the period is equal to or longer than a given length, the management server 103 or other virtual machines 104 may determine that the user has logged out or the like. Examples of actions that may be taken in this case include stopping game program execution of the execution unit 806 that is associated with the logged-out user, and displaying a message to the effect that the user has logged out on the ranking screen. The time counting unit 805 may also measure, for example, how long it has been since the user first used the service described in the embodiment or other examples so that information on a charge to the user, whether or not the user is allowed to continue the use of the service, and the like can be determined by the measured length. The information processing system may be configured so that the number of duplicate game programs which are executed concurrently increases or decreases depending on, for example, the user's situation such as having logged out or having withdrawn from an ongoing competition. The time counting unit 805 may also count, for example, the time since the start of a competition between users in the individual vs. individual one-shot play, individual vs. individual knockout tournament play, or other similar play formats described above, or the time since the detection of a checkpoint set in advance, or may measure the length of the log-out period described above, so that the competition between users is ended when the counted time reaches a given length of time by, for example, stopping the execution of the game program by the execution unit 806. The information processing system in this case may be configured so that, for example, the counted time and the given length of time until, for example, the game is ended are varied depending on whether the competition is in a play format that is similar to individual vs. individual one-shot play and individual vs. individual knockout tournament play, or in other play formats (e.g., when 1P play is selected).

The invention claimed is:

1. An information processing system, comprising:
   a plurality of physical machines, each having a programmed processor device and a co-operating memory device, and each being in communication with one another and with a virtual machine controller having functionality effected by one or more of the processor and memory devices of the physical machines;
   a plurality of virtual machines controlled by the virtual machine controller, each having a respective virtually created set of at least a programmed processor device and a co-operating memory device configured to execute a single-player game program, each virtual machine being established on one or more of the physical machines such that functionality of each virtually created processor device and memory device is effected by one of more of the processor devices and memory devices of the physical machines;
   the virtual machine controller effecting allocation of a first of the virtual machines to a first terminal such that the first terminal can be used to instruct the first virtual machine during execution of the game program by the first virtual machine, and effecting allocation of a second of the virtual machines to a second terminal such that the second terminal can be used to instruct the second virtual machine during execution of the game program by the second virtual machine;
   the virtual machine controller effecting the obtaining of all or a part of pieces of image information that result from executing the game program by the first and second virtual machines and all or a part of pieces of image information that are generated by executing the game program by the first and second virtual machines and stored in a storing unit that is not a signal;
   the virtual machine controller effecting the transmitting, to the first terminal, upon instruction from the first terminal, the all or the part of pieces of image information that result from executing the game program by the first and second virtual machines, and the transmitting, to the second terminal, upon instruction from the second terminal, the all or the part of pieces of image information that are generated by executing the game program by the first and second virtual machines and stored in the storing unit;
   the virtual machine controller effecting the execution of the game program on each virtual machine in synchronization with one another to enable a multi-player competition of a user of the first terminal playing the single-player game against a user of the second terminal playing the single-player game, such synchronization including time counting and checkpoint detection.

2. The information processing system according to claim 1, further comprising a thumbnail image generating unit configured to generate thumbnail image information which comprises the all or the part of pieces of image information that result from executing the player game program by the first and second virtual machines,
   wherein the image information transmitting unit transmits the thumbnail image information to the first terminal.

3. The information processing system according to claim 1, further comprising:
   a plurality of execution information obtaining units configured to obtain execution information which is based on the execution of the game program; and
   a plurality of determining units configured to determine whether or not the execution information meets a condition set in advance,
   wherein, upon instruction from the first terminal, the image information transmitting unit transmits, to the first terminal, the piece of image information that is associated with the first terminal out of the all or the part of pieces of image information, depending on a result of the determination made by each of the plurality of determining units.

4. The information processing system according to claim 1, wherein each of the plurality of virtual machines is configured to execute a plurality of game programs including the game program.

5. An information processing method, comprising:
   executing application single-player game program by a plurality of virtual machines;
   obtaining all or a part of pieces of image information that result from executing the game program by the plurality of virtual machines and all or a part of pieces of image information that are generated by executing the game program by the plurality of virtual machines and stored in a storing unit that is not a signal;
   transmitting, to a first terminal, upon instruction from the first terminal, the all or the part of pieces of image information that result from executing the game program by the plurality of virtual machines; and
   transmitting, to a second terminal, upon instruction from the second terminal, the all or the part of pieces of image information that are generated by executing the game program by the plurality of virtual machines and stored in the storing unit; wherein
   a plurality of physical machines each has a programmed processor device and a co-operating memory device, and each is in communication with one another and with a virtual machine controller having functionality effected by one or more of the processor and memory devices of the physical machines; and wherein
   the plurality of virtual machines are controlled by the virtual machine controller, and each has a respective virtually created set of at least a programmed processor device and a co-operating memory device configured to execute the single-player game program, and each virtual machine is established on one or more of the physical machines such that functionality of each virtually created processor device and memory device is effected by one of more of the processor devices and memory devices of the physical machines; and wherein
   the virtual machine controller effects allocation of a first of the virtual machines to the first terminal such that the first terminal can be used to instruct the first virtual machine during execution of the game program by the first virtual machine, and effects allocation of a second of the virtual machines to the second terminal such that the second terminal can be used to instruct the second virtual machine during execution of the game program by the second virtual machine.

6. A non-transitory computer readable recording medium containing a computer program which, when executed by a computer, causes said computer to function as:
an image information obtaining unit configured to obtain all or a part of pieces of image information that result from executing a game program by a plurality of virtual machines executing an application single-player game program on a cloud platform, and to obtain all or a part of pieces of image information that are generated by executing the game program by the plurality of virtual machines and stored in a storing unit that is not a signal; and
an image information transmitting unit configured to transmit, to a first terminal, upon instruction from the first terminal, the all or the part of pieces of image information that result from executing the game program by the plurality of virtual machines, and, wherein the image information transmitting unit transmits, to a second terminal, upon instruction from the second terminal, the all or the part of pieces of image information that are generated by executing the game program by the plurality of virtual machines and stored in the storing unit; wherein
a plurality of physical machines each has a programmed processor device and a co-operating memory device, and each is in communication with one another and with a virtual machine controller having functionality effected by one or more of the processor and memory devices of the physical machines; and wherein
the plurality of virtual machines are controlled by the virtual machine controller, and each has a respective virtually created set of at least a programmed processor device and a co-operating memory device configured to execute the single-player game program, and each virtual machine is established on one or more of the physical machines such that functionality of each virtually created processor device and memory device is effected by one of more of the processor devices and memory devices of the physical machines; and wherein
the virtual machine controller effects allocation of a first of the virtual machines to the first terminal such that the first terminal can be used to instruct the first virtual machine during execution of the game program by the first virtual machine, and effects allocation of a second of the virtual machines to the second terminal such that the second terminal can be used to instruct the second virtual machine during execution of the game program by the second virtual machine.

7. A terminal comprising:
an operation unit configured to obtain a first operation instruction for obtaining all or a part of pieces of image information that result from executing application single-player game program by a plurality of virtual machines included in a cloud platform, and configured to obtain a second operation instruction for obtaining all or a part of pieces of image information that are generated by executing the game program by the plurality of virtual machines and stored in a storing unit, that is not a signal, included in the cloud platform; and
a display unit configured to obtain the all or the part of pieces of image information that result from executing the game program by the plurality of virtual machines and/or the all or the part of pieces of image information that are generated by executing the game program by the plurality of virtual machines and stored in the storing unit included in the cloud platform; wherein
a plurality of physical machines each has a programmed processor device and a co-operating memory device, and each is in communication with one another and with a virtual machine controller having functionality effected by one or more of the processor and memory devices of the physical machines; and wherein
the plurality of virtual machines are controlled by the virtual machine controller, and each has a respective virtually created set of at least a programmed processor device and a co-operating memory device configured to execute the single-player game program, and each virtual machine is established on one or more of the physical machines such that functionality of each virtually created processor device and memory device is effected by one of more of the processor devices and memory devices of the physical machines; and wherein
the virtual machine controller effects allocation of at least one of the virtual machines to the terminal such that the terminal can be used to instruct the one virtual machine during execution of the game program by the one virtual machine, and effects allocation of at least another of the virtual machines to another terminal such that the other terminal can be used to instruct the other of the machines during execution of the game program by the other virtual machine.

\* \* \* \* \*